United States Patent
Mohammady et al.

(10) Patent No.: US 11,316,831 B2
(45) Date of Patent: Apr. 26, 2022

(54) PARTITION-BASED PREFIX PRESERVING ANONYMIZATION APPROACH FOR NETWORK TRACES CONTAINING IP ADDRESSES

(71) Applicant: Telefonaktiebolaget LM Ericsson (publ), Stockholm (SE)

(72) Inventors: Meisam Mohammady, Montreal (CA); Yosr Jarraya, Montreal (CA); Lingyu Wang, Montreal (CA); Mourad Debbabi, Dollard des Ormeaux (CA); Makan Pourzandi, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 364 days.

(21) Appl. No.: 16/477,428

(22) PCT Filed: Feb. 28, 2018

(86) PCT No.: PCT/IB2018/051293
§ 371 (c)(1),
(2) Date: Jul. 11, 2019

(87) PCT Pub. No.: WO2018/158710
PCT Pub. Date: Sep. 7, 2018

(65) Prior Publication Data
US 2019/0372941 A1    Dec. 5, 2019

Related U.S. Application Data

(60) Provisional application No. 62/464,583, filed on Feb. 28, 2017.

(51) Int. Cl.
*H04L 29/06* (2006.01)
*H04L 9/08* (2006.01)
(Continued)

(52) U.S. Cl.
CPC .......... *H04L 63/0421* (2013.01); *H04L 9/088* (2013.01); *H04W 12/02* (2013.01); *H04W 12/04* (2013.01)

(58) Field of Classification Search
CPC . H04L 63/0421; H04L 9/088; H04L 2209/42; H04L 61/2539; H04L 63/0407;
(Continued)

(56) References Cited

U.S. PATENT DOCUMENTS 9,230,132 B2    1/2016   Gkoulalas-Divanis et al.
9,489,538 B2 *  11/2016  Vyas .................. G06F 21/6254
(Continued)

FOREIGN PATENT DOCUMENTS

EP      3 166 042 A1        5/2017
WO      WO-2014049605 A1 *  4/2014    ......... G06F 21/6254
(Continued)

OTHER PUBLICATIONS

Fan, Jinliang, Jun Xu, Mostafa H. Ammar, and Sue B. Moon. "Prefix-preserving IP address anonymization: Measurement-based security evaluation and a new cryptography-based scheme." Computer Networks 46, No. 2 (2004): 253-272) (Year: 2004).*
(Continued)

*Primary Examiner* — Yogesh Paliwal
(74) *Attorney, Agent, or Firm* — Christopher & Weisberg, P.A.

(57) ABSTRACT

A node including processing circuitry configured to: generate anonymized data based at least in part on a first cryptographic key and network data, calculate a coordination vector, generate initialized data based at least in part on the anonymized data, a second cryptographic key and the coordination vector, transmit the initialized data, the random vector, a security policy and instructions to analyze n iterations of the initialized data and the security policy using
(Continued)

the random vector and the second cryptographic key, and receive results of the analysis of the n iterations of the initialized data and the security policy using the random vector and the second cryptographic key. The analysis of an m iteration of the n iterations correspond to an analysis of the initialized data with prefix preservation where the analysis of the remaining iterations of the n iterations fail to be prefixed preserved.

22 Claims, 17 Drawing Sheets

(51) Int. Cl.
H04W 12/02 (2009.01)
H04W 12/04 (2021.01)

(58) Field of Classification Search
CPC ... H04W 12/02; H04W 12/04; G06F 21/6254; G06F 21/6263
See application file for complete search history.

(56) References Cited

U.S. PATENT DOCUMENTS

| | | | |
|---|---|---|---|
| 2013/0173917 A1 | 7/2013 | Clifton et al. | |
| 2014/0043239 A1* | 2/2014 | Agrawal | G06F 3/04886 345/169 |
| 2015/0169895 A1 | 6/2015 | Gkoulalas-Divanis et al. | |
| 2016/0078239 A1 | 3/2016 | Better et al. | |
| 2016/0147945 A1 | 5/2016 | MacCarthy et al. | |
| 2016/0283661 A1 | 9/2016 | Zwinger | |
| 2017/0124335 A1 | 5/2017 | Freudiger et al. | |
| 2017/0124336 A1 | 5/2017 | Freudiger et al. | |
| 2018/0004978 A1* | 1/2018 | Hebert | G06F 21/6254 |

FOREIGN PATENT DOCUMENTS

| | | | | |
|---|---|---|---|---|
| WO | 2015/016828 A1 | 2/2015 | | |
| WO | WO-2016057347 A1 * | 4/2016 | ......... | G06F 21/6263 |

OTHER PUBLICATIONS

Brekne, Tønnes, André Årnes, and Arne Øslebø. "Anonymization of ip traffic monitoring data: Attacks on two prefix-preserving anonymization schemes and some proposed remedies." International Workshop on Privacy Enhancing Technologies. Springer, Berlin, Heidelberg, 2005 (Year: 2005).*
International Search Report and Written Opinion of the International Searching Authority dated May 22, 2018 issued in PCT Application No. PCT/IB2018/051293, consisting of 14 pages.
Tonnes Brekne et al., Anonymization of IP Traffic Monitoring Data: Attacks on Two Prefix-Preserving Anonymization Schemes and Some Proposed Remedies, Centre for Quantifiable Quality of Service in Communication Systems, Springer-Verlag, Berlin, Heidelberg, 2006, consisting of 18 pages.
Tonnes Brekne et al., Circumventing IP-Address Pseudonymization, Centre for Quantifiable Quality of Service in Communication Systems, Norwegian University of Science and Technology, Oct. 2005, consisting of 6 pages.
Fei Chen et al., Privacy-Preserving Cross-Domain Network Reachability Quantification; 2011 19th IEEE International Conference on Network Protocols, consisting of 10 pages.
Valentina Ciriani, Fragmentation and Encryption to Enforce Privacy in Data Storage; European Symposium on Researching Computer Security, Berlin, Germany, 2007, consisting 16 pages.
George T. Duncan et al., Disclosure Limitation Methods and Information Loss for Tabular Data, Confidentiality, Disclosure and Data Access: Theory and Practical Applications for Statistical Agencies, May 24, 2001, consisting of 31 pages.
Jniliang Fan, Prefix-Preserving IP Address Anonymization: Measurement-Based Security Evaluation and a New Cryptography-Based Scheme, Computer Networks, Elsevier, Amsterdam, Oct. 7, 2004, consisting of 20 pages.
Rosario Gennaro et al., Non-Interactive Verifiable Computing: Outsourcing Computation to Untrusted Workers, International Association for Cryptologic Research, 2010, consisting of 17 pages.
Justin King et al., A Taxonomy and Adversarial Model for Attacks Against Network Log Anonymization, Honolulu, Hawaii, Mar. 2009; Proceedings of the 2009 ACM Symposium on Applied Computing, consisting of 8 pages.
Adam J. Lee et al., A Privacy-Preserving Interdomain Audit Framework, Proceedings of the 6th ACM Workshop on Privacy in Electronic Safety, ACM 2006, consisting of 10 pages.
Ashwin Machanavajjhala et al., I-Diversity: Privacy Beyond k-Anonymity, Procedures of the 22nd IEEE International Conference on Data Engineering (ICDE), Atlanta, Georgia, 2006, consisting of 12 pages.
Cristian Morariu et al., Design and Implementation of a Distributed Platform for Sharing IP Flow Records, Department of Informatics, IFI, University of Zurich, Switzerland, Springer International Publishing, Oct. 2009, consisting of 14 pages.
Ruoming Pang et al., The Devil and Packet Trace Anonymization, Princeton University, International Computer Science Institute, Lawrence Berkeley National Laboratory (LBNL), ACM Computer Communication Review, vol. 36, No. 1, Jan. 2006, consisting of 10 pages.
Bruno Ribeiro et al., Analyzing Privacy in Enterprise Packet Trace Anonymization, UMass CMPSCI Technical Report 48-07, Sep. 2007, consisting of 7 pages.
Daniele Riboni et al., Obfuscation of Sensitive Data in Network Flows, INFOCOM, 2012 Proceedings IEEE. IEEE, 2012, consisting of 9 pages.
Samarati et al., Protecting Privacy When Disclosing Information: k-Anonymity and its Enforcement Through Generalization and Suppression, Technical Report, SRI International, 1998, consisting of 19 pages.
Samarati, Pierangela, Protecting Respondents' Identities in Microdata Release, IEEE Transactions of Knowledge and Data Engineering 13.6 (2001), consisting of 29 pages.
Adam J. Slagell et al., Sharing Computer Network Logs for Security and Privacy: A Motivation for New Methodologies of Anonymization, National Center for Supercomputing Applications, University of Illinois, Sep. 2004, consisting of 17 pages.
Truta et al., Privacy Protection: p-Sensitive k-Anonymity Property, Data Engineering Workshops, 2006 Proceedings, 22nd International Conference on Management of Data ACM 2006, consisting of 10 pages.
Avishai Wool, A Quantative Study of Firewall Configuration Errors, Computer 37.6, Jun. 2004, consisting of 6 pages.
Xiaokui Xiao et al., Personalized Privacy Preservation, Proceedings of the 2006 ACM SIGMOD International Conference on Management of Data. ACM, Jun. 27-29, 2006, consisting of 12 pages.
Jun Xu, et al., Prefix-Preserving IP Address Anonymization: Measurement-Based Security Evaluation and a New Cryptography-Based Scheme, Proceedings of the 10th IEEE International Conference on Network Protocols, 2002, consisting of 10 pages.
Ting-Fan Yen et al., Browser Fingerprinting from Coarse Traffic Summaries: Techniques and Implications, Proc. of Detection of Intrusions and Malware & Vulnerability Assessment, vol. 5587, Springer, 2009, consisting of 19 pages.
International Search Report and Written Opinion of the International Searching Authority dated Jul. 17, 2018 issued in PCT Application No. PCT/IB2018/051288, consisting of 15 pages.

* cited by examiner

| Start time | SrcIPaddr | SrcPort | DstIPaddr | DstPort | P | Pkts | B/Pkts |
|---|---|---|---|---|---|---|---|
| 10:53:42.50 | 192.1.6.69 | 77 | 194.20.2.2 | 1308 | 6 | 1 | 40 |
| 10:53:42.54 | 192.1.6.222 | 1243 | 194.20.2.2 | 1774 | 6 | 1 | 40 |
| 10:53:42.55 | 192.1.6.108 | 1076 | 194.20.2.2 | 1869 | 6 | 1 | 40 |
| 10:53:42.55 | 192.1.6.159 | 903 | 194.20.2.2 | 1050 | 6 | 1 | 40 |

| Start time | SrcIPaddr | SrcPort | DstIPaddr | DstPort | P | Pkts | B/Pkts |
|---|---|---|---|---|---|---|---|
| 10:53:42.50 | 192:1.6.69 | 77 | 194.20.2.2 | 1308 | 6 | 1 | 40 |
| 10:53:42.54 | 192:1.6.222 | 1243 | 194.20.2.2 | 1774 | 6 | 1 | 40 |
| 10:53:42.55 | 192:1.6.108 | 1076 | 194.20.2.2 | 1869 | 6 | 1 | 40 |
| 10:53:42.55 | 192:1.6.159 | 903 | 194.20.2.2 | 1050 | 6 | 1 | 40 |
| ⋮ | | | | | | | |

| Start time | SrcIPaddr | SrcPort | DstIPaddr | DstPort | P | Pkts | B/Pkts |
|---|---|---|---|---|---|---|---|
| 0:03:22.20 | 26.52.09.82 | - | 119.106.10.56 | - | 6 | 1 | 40 |
| 0:03:22.24 | 26.52.09.46 | - | 119.106.10.56 | - | 6 | 1 | 40 |
| 0:03:22.25 | 26.52.09.123 | - | 119.106.10.56 | - | 6 | 1 | 40 |
| 0:03:22.25 | 26.52.09.10 | - | 119.106.10.56 | - | 6 | 1 | 40 |

$\mathcal{L}_2$

| Start time | SrcIPaddr | SrcPort | DstIPaddr | DstPort | P | Pkts | B/Pkts |
|---|---|---|---|---|---|---|---|
| 0:03:22.20 | 106.22.70.12 | - | 79.12.101.03 | - | 6 | 1 | 40 |
| 0:03:22.24 | 106.22.70.86 | - | 79.12.101.03 | - | 6 | 1 | 40 |
| 0:03:22.25 | 106.22.70.23 | - | 79.12.101.03 | - | 6 | 1 | 40 |
| 0:03:22.25 | 106.22.70.90 | - | 79.12.101.03 | - | 6 | 1 | 40 |
| ⋮ | | | | | | | |

Processing blocks: $PP(-, k_0) \rightarrow PP(-, k_1)$

FIG. 5

PARTITION-BASED PREFIX PRESERVING ANONYMIZATION APPROACH FOR NETWORK TRACES CONTAINING IP ADDRESSES

CROSS-REFERENCE TO RELATED APPLICATIONS

This application is a Submission Under 35 U.S.C. § 371 for U.S. National Stage Patent Application of International Application No.: PCT/IB2018/051293, filed Feb. 28, 2018 entitled "PARTITION-BASED PREFIX PRESERVING ANONYMIZATION APPROACH FOR NETWORK TRACES CONTAINING IP ADDRESSES," which claims priority to U.S. Provisional Application No. 62/464,583, filed Feb. 28, 2017, entitled "PARTITION-BASED PREFIX PRESERVING ANONYMIZATION APPROACH FOR NETWORK TRACES IN THE CLOUD," the entireties of both of which are incorporated herein by reference.

FIELD

This disclosure relates to wireless communications, and in particular, to partition-based prefix preserving anonymization for network data.

BACKGROUND

Several trends in Internet computing have led to the popularization of many forms of virtual organizations. Examples include cloud computing, supply chain management, grid computing, and collaborative research environments. Unfortunately, when it comes to the security analysis of these systems, local intrusion detection and audit practices are insufficient for detecting distributed attacks such as coordinated network reconnaissance, stepping-stone attacks, and violations of application-level trust constraints between security domains. To be able to detect these attacks, there is need to share different network traces from different actors among all the actors. At the same time when sharing these traces among different actors, there is need by law to preserve the privacy of different users. Therefore, there is need to use privacy preserving (PP) tools to share network traces among different actors.

In the cloud environment, many applications from the regulated industry run. For those applications, there is often need to provide a report of compliance to the auditors. At the same time, the auditing in the cloud could do much to reassure the cloud tenants about the security of their applications. In both cases, there is need for the traces from the cloud service provider (CSP) to be exported to the 3rd party auditors while preserving other tenants' privacy, Therefore, the PP tools are of great interest to the cloud solutions.

The most widely used techniques for anonymizing network data are truncation, randomization, quantization, and pseudonymization.

Truncation and randomization effectively destroy the semantics of the field they are applied to. One example is the payload of packets, which might contain usernames and passwords, and are removed from the data as standard practice. Quantization techniques, such as limiting the precision of time stamps, are applied to reduce the information gained about the identity of the workstations from timing attacks. The most widely used technique is pseudonymization, and particularly internet protocol (IP) addresses pseudonymization which replaces IP addresses found in the data with linkable, prefix-preserving pseudonyms (PP). These pseudonyms preserve the hierarchical relationships found in the prefixes of the original addresses. The underlying goal is to enable the analysis of packets generated from hosts, or whole prefixes, without providing the actual, i.e., original, IP addresses.

CryptoPAn is a well-known cryptography-based (based on Rijndael block cipher adopted by National Institute of Standards and Technology (NIST) as Advanced Encryption Standard (AES)) prefix-preserving sanitization tool for network trace used to anonymize IP addresses in traces. It uses a single secret key across multiple traces which allows to have a consistent anonymization where the same IP address in different traces is anonymized to the same address (i.e. one-to-one mapping). For instance, if two original IP addresses share a k-bit prefix, their anonymized mappings will also share a k-bit prefix. The same IP address in different traces is anonymized to the same address, even though the traces might be sanitized separately at different time and/or at different locations. The construction of CryptoPAn preserves the secrecy of the key and the (pseudo) randomness of the mapping from an original IP address to its anonymized counterpart.

However, those techniques proved to be ineffective, since an adversary might be able to re-identify message source and destination by other values in a network flow, or in a sequence of flows as has been shown in several studies. Hence, these techniques are vulnerable to semantic attacks.

One solution that has been proposed involves first removing scans from traces to mitigate injection attacks, where prefixes are not fully preserved for addresses internal to the enterprise. This is meant to sacrifice the utility of the trace in order to resist attacks. Instead of pure or full prefix preservation, the subnet and host portions of each address are anonymized separately, but subnet relationships are preserved. Thus, the dependency is broken across bits by anonymizing the subnet and host portion of the addresses as independent blocks using a pseudo-random permutation. This is referred to as an example of partial prefix preservation.

Semantic Attacks

Another solution proposed an extensive taxonomy of attacks against network flow sanitization methods; techniques fall into two main categories:

Fingerprinting: re-identification is performed by matching flows_fields' values to the characteristics of the target environment (such as knowledge of network topology and its settings, types of OS and services of target hosts, etc.). Typical re-identifying values for network flows are: Type of Service (tos), TCP Flags, number/quantity of bytes, and number/quantity of packet per flow.

Injection: the adversary injects a sequence of flows in the network to be logged, that are easily recognized due to their specific characteristics; e.g., marked with uncommon TCP flags, or following particular patterns. Additional techniques can be used to exploit the results of the above attacks to decrypt IP addresses of new network flows. In particular, if the IP address encryption is performed with the same key across the whole set of flows (as in most existing defense techniques), and the adversary discovers an IP mapping in one flow, he can decrypt the same IP address in any other flow.

While several network trace anonymization techniques have been proposed, they all have ended up with serious weaknesses. The released data is heavily sanitized and anonymized, limiting their research value. Worse, as demonstrated by research and real-life mishaps, anonymization is vulnerable to attacks that infer sensitive information.

Because of this fear, many data owners today prefer the safer option of not releasing data at all.

Vulnerabilities in IP trace anonymization are now widely known. For example, one study provides a thorough categorization including injection attacks (in which a recognizable pattern of traffic is introduced to the trace by the attacker), fingerprinting attacks (in which properties of real addresses are matched to addresses exhibiting those properties in the trace), and structure recognition (in which, for example, the de-anonymization of one address is used to narrow the possible de-anonymizations of other addresses when prefix structure is preserved). Another study describes both fingerprinting and injection attacks on prefix-preservation for powerful adversaries assumed capable of forging trace traffic and granted knowledge of the traffic distribution.

SUMMARY

According to one aspect of the disclosure, a node for anonymizing network data for analysis by another node is provided. The node includes processing circuitry configured to: generate anonymized data based at least in part on a first cryptographic key and network data, calculate a coordination vector based at least in part on a random vector, generate initialized data based at least in part on the anonymized data, a second cryptographic key and the coordination vector where the second cryptographic key is independent from the first cryptographic key, transmit the initialized data, the random vector, a security policy, the second cryptographic key and instructions to analyze n iterations of the initialized data and the security policy using the random vector and the second cryptographic key, and receive results of the analysis of the n iterations of the initialized data and the security policy using the random vector and the second cryptographic key. The analysis of an m iteration of the n iterations correspond to an analysis of the initialized data with prefix preservation where the analysis of the remaining iterations of the n iterations fail to be prefixed preserved, where n and m are integers and n is greater than m.

According to one embodiment of this aspect, the processing circuitry is further configured to partition the network data into a plurality of non-overlapping partitions where the generating of the initialized data includes applying at least one cryptographically based anonymization function to each one of the plurality of non-overlapping partitions. According to one embodiment of this aspect, the coordination vector is calculated based at least in part on the random vector and a key combination vector where the key combination vector allows for the m iteration to be prefix preserved. According to one embodiment of this aspect, if m times the random vector is added to the coordination vector, a resulting vector of this addition operation provides prefix preservation of initialed data with respect to the network data during the analysis.

According to one embodiment of this aspect, the network data includes a plurality of destination internet protocol addresses and a plurality of source internet protocol addresses. According to one embodiment of this aspect, the security policy includes at least one rule to be applied during the analysis. According to one embodiment of this aspect, the anonymized data is generated by applying at least one cryptographic operation to the network data using the first cryptographic key. The initialized data is generated by applying the at least one cryptographic operation to the anonymized data using the second cryptographic key and the coordination vector. According to one embodiment of this aspect, the instructions to analyze n iterations of the initialized data and the security policy using the random vector and the second cryptographic key includes instructions to apply at least one cryptographic operation to the initialized data using the second cryptographic key and the random vector. According to one embodiment of this aspect, the processing circuitry is further configured to transmit the second cryptographic key.

According to another aspect of the disclosure, a method for a node for anonymizing network data for analysis by another node is provided. Anonymized data based at least in part on a first cryptographic key and network data is generated. A coordination vector is calculated based at least in part on a random vector. Initialized data is generated based at least in part on the anonymized data, a second cryptographic key and the coordination vector where the second cryptographic key is independent from the first cryptographic key. The initialized data, the random vector, a security policy, the second cryptographic key and instructions to analyze n iterations of the initialized data and the security policy using the random vector and the second cryptographic key are transmitted. Results of the analysis of the n iterations of the initialized data and the security policy using the random vector and the second cryptographic key are received. The analysis of an m iteration of the n iterations corresponds to an analysis of the initialized data with prefix preservation where the analysis of the remaining iterations of the n iterations fail to be prefixed preserved, where n and m are integers and n is greater than m.

According to one embodiment of this aspect, the network data is partitioned into a plurality of non-overlapping partitions, the generating of the initialized data includes applying at least one cryptographically based anonymization function to each one of the plurality of non-overlapping partitions. According to one embodiment of this aspect, the coordination vector is calculated based at least in part on the random vector and a key combination vector where the key combination vector allows for the m iteration to be prefix preserved. According to one embodiment of this aspect, if m times the random vector is added to the coordination vector, a resulting vector of this addition operation provides prefix preservation of initialed data with respect to the network data during the analysis.

According to one embodiment of this aspect, the network data includes a plurality of destination internet protocol addresses and a plurality of source internet protocol addresses. According to one embodiment of this aspect, the security policy includes at least one rule to be applied during the analysis. According to one embodiment of this aspect, the anonymized data is generated by applying at least one cryptographic operation to the network data using the first cryptographic key. The initialized data is generated by applying the at least one cryptographic operation to the anonymized data using the second cryptographic key and the coordination vector. According to one embodiment of this aspect, the instructions to analyze n iterations of the initialized data and the security policy using the random vector and the second cryptographic key includes instructions to apply at least one cryptographic operation to the initialized data using the second cryptographic key and the random vector. According to one embodiment of this aspect, the processing circuitry is further configured to transmit the second cryptographic key.

According to another aspect of the disclosure, a node for anonymizing network data for analysis by another node is provided. The node includes an anonymization module configured to: generate anonymized data based at least in part on a first cryptographic key and network data, generate initialized data based at least in part on the anonymized data, a second cryptographic key and a coordination vector where the second cryptographic key is independent from the first cryptographic key, and transmit the initialized data, a random vector, a security policy, the second cryptographic key and instructions to analyze n iterations of the initialized data and the security policy using the random vector and the second cryptographic key. The anonymization module is further configured to receive results of the analysis of the n iterations of the initialized data and the security policy using the random vector and the second cryptographic key where the analysis of an m iteration of the n iterations corresponds to an analysis of the initialized data with prefix preservation. The analysis of the remaining iterations of the n iterations fail to be prefixed preserved where n and m are integers and n is greater than m.

According to one embodiment of this aspect, the anonymization module is further configured to partition the network data into a plurality of non-overlapping partitions where the generating of the initialized data includes applying at least one cryptographically based anonymization function to each one of the plurality of non-overlapping partitions. According to one embodiment of this aspect, the coordination vector is calculated based at least in part on the random vector and a key combination vector where the key combination vector allowing for the m iteration to be prefix preserved. According to one embodiment of this aspect, if m times the random vector is added to the coordination vector, a resulting vector of this addition operation provides prefix preservation of initialed data with respect to the network data during the analysis.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is an example of record time entries is shown in NetFlow trace data file in accordance with the principles of the disclosure;

FIG. 5 is an example, of applying prefix-preservation on records of a previous data trace in accordance with the principles of the disclosure;

DETAILED DESCRIPTION

Figure 1:
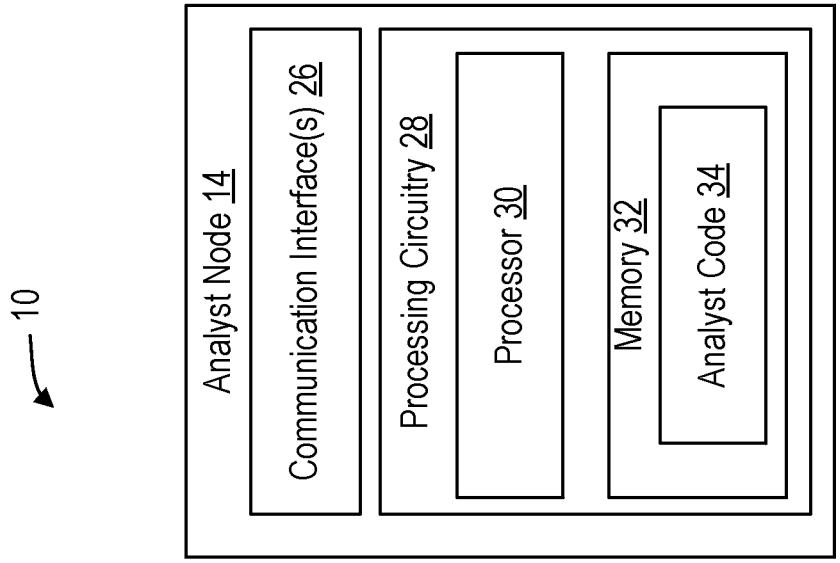
FIG. 1 an exemplary system for partition-based prefix preserving anonymization for network traces in accordance with the principles of the disclosure.
Figure 1:
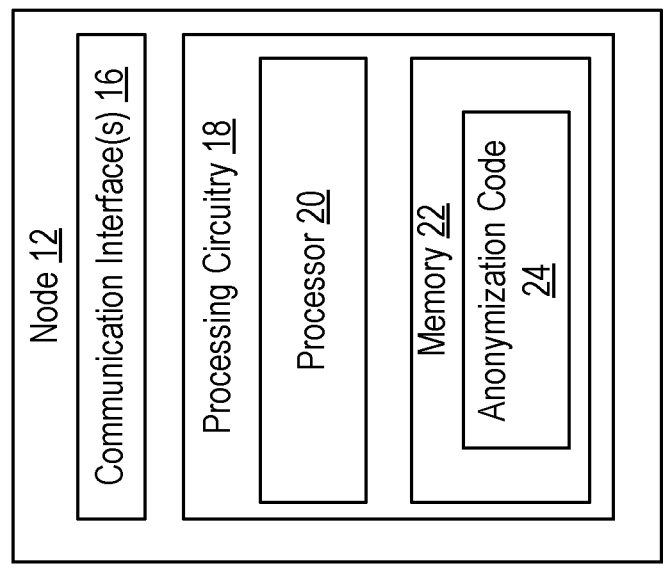

A potential weakness in CryptoPAn is that the prefix-preserving methodology of CryptoPAn anonymizes addresses such that any given bit of the anonymized address is dependent on all previous bits of the unanonymized address. This dependence can cause a single deanonymization to affect all anonymized addresses that share a prefix with the true address. In fact, one study described above demonstrated how active probing attacks can be used to systematically undermine the CryptoPAn anonymization scheme.

The disclosure relates to wireless communications, and in particular, to partition-based prefix preserving anonymization for network data. The disclosure describes a new approach for publishing the network trace while maintaining the tenant's privacy. This approach can improve the trade-off between privacy-utility by introducing extra computation. There is no extra storage overhead for log/data management with this approach. In this approach, the network traces from Cloud Service Provider (CSP) are anonymized and sent to the 3rd party for evaluation against some security policy or some compliance framework such as Cloud Security Alliance (CSA) Cloud Controls Matrix (CCM).

The original data set is anonymized by the log (i.e., data or network data) owner or log node (e.g., CSP) and sent to the analyst or analyst node, i.e., third party. Intuitively, several views are built from the original anonymized data set. The analyst analyzes each view and returns the results to the log owner. However, since one of those views, which is referred to herein as the utility-driven view, is a dataset that corresponds to the original dataset, its corresponding analysis result will be the valid analysis result. This result will be easily identified by the log owner who primarily calculated all views. Note that the analyst cannot know what results among those sent to the log owner is the right one, as described herein. Additionally, this approach described herein could not find out what's the PP mechanism used to perform the anonymization.

In other words, among other benefits, the approach described herein improves the trade-off between privacy-utility by introducing extra computation. There is no extra storage overhead for log management with this approach.

Privacy:

To solve semantic attacks, e.g., injection and fingerprinting attacks on CryptoPAn, a partition-based prefix preserving anonymization approach is introduced herein. Semantic attacks are effective when the anonymization function is known and there is a one-to-one correspondence between the original and anonymized values.

The anonymization approach described herein applies different number/quantity of cryptographic operations (i.e., PP) on different partitions. Therefore, the approach described herein is a one-to-many function. Hence de-anonymization will be difficult. Instead of finding one mapping function F to de-anonymize the information in the traces, we now define r partitions are defined, namely $PP_1, \ldots, PP_r$, corresponding each to a partition. This renders semantic attacks techniques not efficient.

Utility:

Some embodiments described herein include a privacy-preserving technique that entirely preserves the utility of the outsources log. All existing studies/works in data publishing normally trade-off privacy with utility of the log, by removing all sensitive data from the original data, making it no more useful for certain analysis such as auditing or any analysis that needs to keep certain structure of the trace log. The approach described herein, on the other hand, preserves privacy in trade-off with computation cost. Intuitively, several views of the original data are sent to the analyst and results of analyzing each view will be returned. However, since one of those views, referred to herein as the utility-driven view, is a dataset that is very close to the original dataset, its corresponding analysis result will be the valid analysis result. This result will be easily identified by the log owner who primarily calculated all views. In one or more embodiments, a view may generally refer to encrypted data and/or original data and/or a dataset.

Note that the data log owner generates different views of the original log so that:

1. The utility-driven view must be kept hidden among all other views, i.e., all views must be equally indistinguishable.

2. Each of the views other than the utility-driven view one must be designed so that they do not leak too much information about the original dataset.

Some embodiments described herein solve the overhead problem which represent a problem in several state-of-the-art studies/works that claim to be one-to-many techniques (mainly applied in data mining applications). These studies/works insert fake entries into the records and thus increase the log size, while in the approach described herein, the size of the anonymized log is not increased since fake records are not inserted. Rather, in one or more embodiments, different views of the same log are generated using different combinations of the same key. In one or more embodiments described herein, key refers to a cryptographic key. The result of the fully prefix preserving view is sent back to the log owner without the analyst knowing which of the security reports produced is the correct one. In one or more embodiments, retrieval is performed by private information retrieval. This technique preserves the utility of the log (original values for all the field and fully prefix preserving mapping of IP addresses).

Before describing in detail exemplary embodiments, it is noted that the embodiments reside primarily in combinations of node components and processing steps related to partition-based prefix preserving anonymization for network data such as network traces. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for partition-based prefix preserving anonymization for network data in accordance with the principles of the disclosure and designated generally as "10". System 10 includes one or more nodes 12 and one or more analyst nodes 14, in communication with each other via one or more communication networks using one or more communication protocols.

Node 12 includes one or more communication interfaces 16 for communicating with analyst node 14, other nodes and/or other entities in system 10 via one or more communication protocols, e.g., TCP/IP, wired and/or wireless communication protocols, among other communication protocols described herein and/or known in the art. In one or more embodiments, one or more communication interfaces 16 are replaced one or more transmitters and/or one or more receivers communicating signals, packets, etc.

Node 12 includes processing circuitry 18. Processing circuitry 18 includes processor 20 and memory 22. Processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or reading from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communication, e.g., configuration and/or address data of nodes, etc.

Processing circuitry 18 may be configured to control any of the methods and/or processes described herein and/or to cause such methods and/or processes to be performed, e.g., by node 12. Corresponding instructions may be stored in memory 22, which may be readable and/or readably connected to processor 20. One or more processors 20 are configured to perform node 12 functions described herein. Memory 22 is configured to store data, programmatic software code and/or other information described herein. Memory 22 is configured to store anonymization code 24. For example, anonymization code 24 includes instructions that, when executed by processor 20, causes processor 20 to perform the one or more processes discussed herein with respect to node 12, i.e., data owner. Note further, that functions described herein as being performed by node 12 may be distributed over a plurality of nodes 12 and/or other nodes. In other words, it is contemplated that the functions of node 12 described herein are not limited to performance by a single physical device and, in fact, can be distributed among several physical devices within a single physical location or across a network such as the Internet.

Analyst node 14 includes one or more communication interfaces 26 for communicating with node 12, other nodes and/or other entities in system 10 via one or more communication protocols e.g., TCP/IP, wired and/or wireless communication protocols, among other communication protocols described herein and/or known in the art. In one or more embodiments, one or more communication interfaces 16 are replaced one or more transmitters and/or one or more receivers communicating signals, packets, etc.

Analyst node 14 includes processing circuitry 28. Processing circuitry 28 includes processor 30 and memory 32. Processing circuitry 28 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or reading from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 30 and/or other data, e.g., data pertaining to communication, e.g., configuration and/or address data of nodes, etc.

Processing circuitry 28 may be configured to control any of the methods and/or processes described herein and/or to cause such methods and/or processes to be performed, e.g., by analyst node 14. Corresponding instructions may be stored in memory 32, which may be readable and/or readably connected to processor 30. One or more processors 30 are configured to perform analyst node 14 functions described herein. Memory 32 is configured to store data, programmatic software code and/or other information described herein. Memory 32 is configured to store analyst code 34. For example, analyst code 34 includes instructions that, when executed by processor 30, causes processor 30 to perform the one or more processes discussed herein with respect to analyst node 14, i.e., analyst. Note further, that functions described herein as being performed by analyst node 14 may be distributed over a plurality of analyst node 14 and/or other nodes. In other words, it is contemplated that the functions analyst node 14 described herein are not limited to performance by a single physical device and, in fact, can be distributed among several physical devices within a single physical location or across a network such as the Internet.

Figure 2:
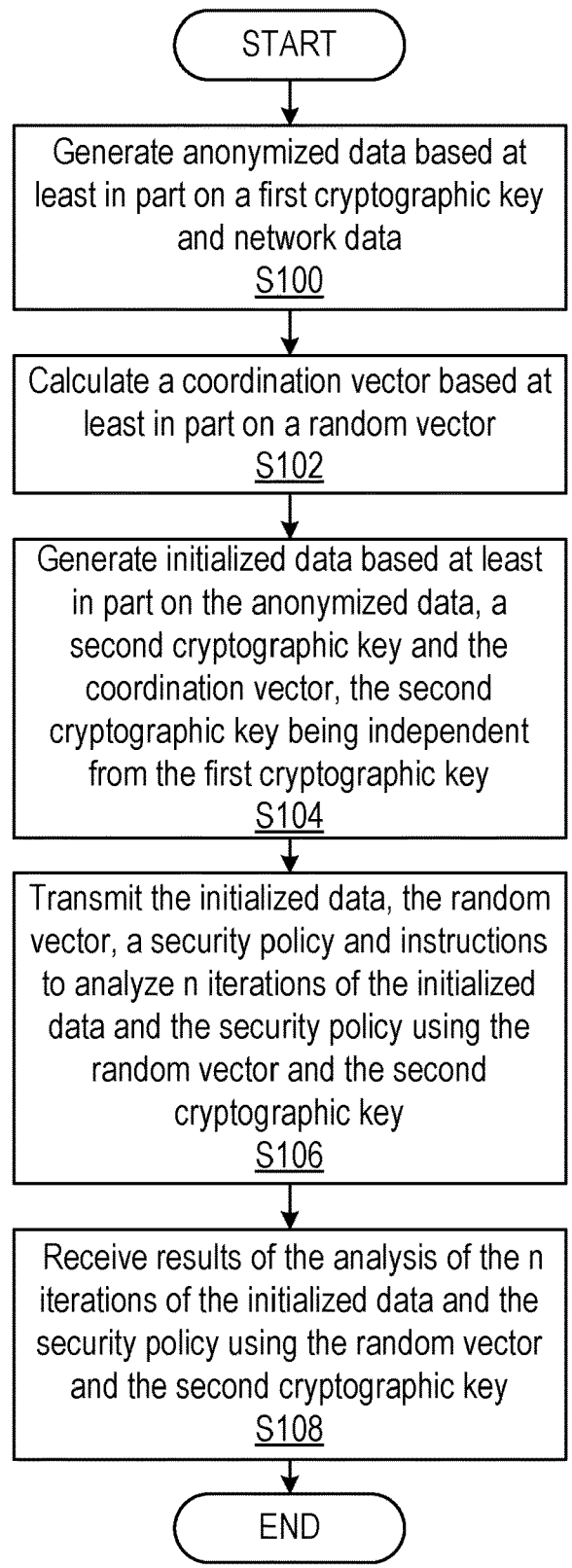
FIG. 2 is a flow diagram of an exemplary process of anonymization code in accordance with the principles of the disclosure.

FIG. 2 is a flow diagram of an exemplary process for anonymization code 24 in accordance with the principles of the disclosure. Processing circuitry 18 is configured to generate an anonymized data based on a first cryptographic key ($k_0$), i.e., initial cryptographic key, and network data (L), i.e., data log, as described herein (Block S100). Processing circuitry 18 is further configured to calculate a coordination vector ($V_0$) based at least in part on a random vector (V) (Block S102). Processing circuitry 18 is configured to generate an initialized data ($L_0$), i.e., initialized data log, based at least in part on the anonymized data, a second cryptographic key (k), i.e., master cryptographic key, and a coordination vector ($V_0$), i.e., initial coordination vector, as described herein (Block S104). In one or more embodiments, the master/second cryptographic key (k) is independent from the initial/first cryptographic key ($k_0$).

Processing circuitry 18 is configured to transmit the initialized data ($L_0$), random vector (V), a security policy (SecPolicy$_1$), the second cryptographic key (k) and instructions to analyze N iterations of the initialized data ($L_0$) and the security policy (SecPolicy$_1$) using the random vector (V) with the second/master cryptographic key (k), as described herein (Block S106). In one or more embodiments, the transmitted security policy (SecPolicy$_1$) is based on a security policy (SecPolicy$_0$) that is anonymized in a similar manner as the anonymization of the initialized data. Processing circuitry 18 is configured to receive results of the analysis of the n iterations of the initialized data ($L_0$) and security policy (SecPolicy$_1$) using the random vector (V) and the master/second cryptographic key (k), as described herein (Block S108). In one or more embodiments, the analysis of an m iteration of the n iterations corresponds to an analysis of the initialized data with prefix preservation where the analysis of the remaining iterations of the n iterations fail to be prefixed preserved, where n and m are integers and n is greater than m.

According to one or more embodiments, the processing circuitry 18 is further configured to partition the network data into a plurality of non-overlapping partitions where the generating of the initialized data includes applying at least one cryptographically based anonymization function to each one of the plurality of non-overlapping partitions. According to one or more embodiments, the coordination vector is calculated based at least in part on the random vector and a key combination vector where the key combination vector allows for the m iteration to be prefix preserved. According to one or more embodiments, if m times the random vector is added to the coordination vector, a resulting vector of this addition operation provides prefix preservation of initialed data with respect to the network data during the analysis.

According to one or more embodiments, the network data includes a plurality of destination internet protocol addresses and a plurality of source internet protocol addresses. According to one or more embodiments, the security policy includes at least one rule to be applied during the analysis. According to one or more embodiments of this aspect, the anonymized data is generated by applying at least one cryptographic operation to the network data using the first cryptographic key. The initialized data is generated by applying the at least one cryptographic operation to the anonymized data using the second cryptographic key and the coordination vector. According to one or more embodiments of this aspect, the instructions to analyze n iterations of the initialized data and the security policy using the random vector and the second cryptographic key includes instructions to apply at least one cryptographic operation to the initialized data using the second cryptographic key and the random vector. According to one or more embodiments, the processing circuitry 18 is further configured to transmit the second cryptographic key.

Figure 3:
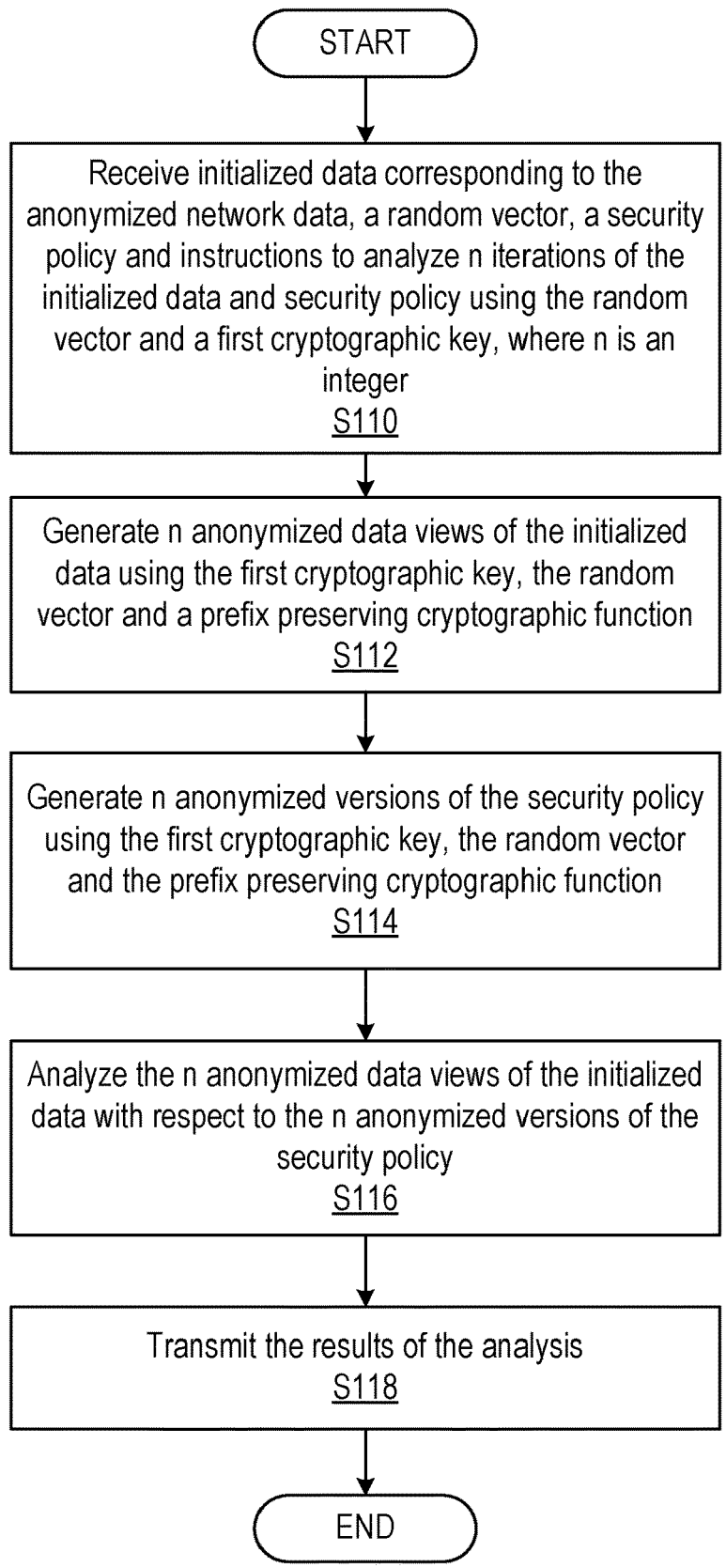
FIG. 3 is a flow diagram of an exemplary process of analyst code in accordance with the principles of the disclosure.

FIG. 3 is a flow diagram of an exemplary process of analyst code 34 in accordance with the principles of the disclosure. Processing circuitry 28 is configured to receive initialized data ($L_0$), a random vector (V), a security policy ($SecPolicy_1$), optionally a master/second cryptographic key (k), and instructions to analyze n iterations of the initialized data ($L_0$) and security policy ($SecPolicy_1$) using the random vector (V) and the first cryptographic key, where n is an integer, as described herein (Block S110). Processing circuitry 28 is configured to generate n anonymized data views of the initialized data ($L_0$) using the first cryptographic key where the random vector (V) and a prefix preserving (PP) function such as a prefix preserving cryptographic function for performing a cryptographic operation, as described herein (Block S112). Processing circuitry 28 is configured to generate n anonymized versions of the security policy using the master/second cryptographic key, random vector (V) and a prefix preserving (PP) function such as a prefix preserving cryptographic function, as described herein (Block S114). Processing circuitry 28 is configured to analyze the n anonymized data views of the initialized data ($L_0$) with respect to the n anonymized versions of the security policy ($SecPolicy_1$), as described herein (Block S116). Processing circuitry is configured to transmit the results of the analysis (Block S118).

According to one or more embodiments, the encrypted anonymized data is based at least in part on: encryption of first network data including the first tenant identifier using second cryptographic key to generate first encrypted data; anonymizing of the first encrypted data to generate anonymized data where the anonymizing of the first encrypted data includes segmenting the first encrypted data based at least in part on the encrypted first tenant identifier and where the anonymizing of the first encrypted data preserves relationships among the first network data associated with the first tenant identifier; and encryption of the anonymized data using the first cryptographic key to generate the encrypted anonymized data. According to one or more embodiments, the at least one analysis parameter is a two dimensional matrix where values of the two dimensional matrix indicate a quantity of times to apply a cryptographically based function to a segment of the encrypted anonymized data using the first cryptographic key.

According to one or more embodiments, a quantity of columns in the two dimensional matrix indicate a quantity of copies of the encrypted anonymized data to generate; and each data view corresponding to an application of a respective column of the two dimensional matrix to a respective copy of the encrypted anonymized data. According to one or more embodiments, a quantity of rows in the two dimensional matrix correspond to a quantity of segments in the encrypted anonymized data. According to one or more embodiments, the encrypted anonymized data is further based at least in part on: encrypting second data including a second tenant identifier using a third cryptographic key to generate second encrypted data, and anonymizing of the second encrypted data to generate a portion of the anonymized data where the anonymizing of the second encrypted data includes segmenting the second encrypted data based at least in part on the encrypted second tenant identifier and where the anonymizing of the second encrypted data preserves relationships among the second data associated with the second tenant identifier. According to one or more embodiments, each data view includes: a portion that preserves relationships among the second data associated with the second tenant identifier; and a portion that fails to preserve relationships among the second data associated with the second tenant identifier.

Additional details are provided as follows:

Preliminaries

A log L consists of a set of records $\{r_i\}_{i \in \mathbb{N}}$ or network data. Each record $r_i$ is a combination various fields. For example, the following fields are the minimum set of fields found in a NetFlow record: IP address pairs (source/-destination), port pairs (source/-destination), protocol (Transmission Control Protocol (TCP)/User Datagram Protocol (UDP)/Internet Control Message Protocol (ICMP)), packets per second, byte counts, and timestamps. One example of record time entries is shown in NetFlow trace log file illustrated in FIG. 4. Since an IP address uniquely identifies its host, it is assumed that confidential information in a network flow is the set of attributes {src addr, dst addr}, i.e., source internet protocol address and destination internet protocol address. Also, S is considered to be the identifiers for these records:

S=(srcIP, dstIP).

The anonymization of IP addresses is considered as described below.

Two IP addresses a and b such that $a=a_1a_2 \ldots an$ and $b=b_1b_2 \ldots n$, share a prefix of k bits ($0 \leq k \leq n$), if $a_1a_2 \ldots a_k=b_1b_2 \ldots b_k$ and $a_{k+1} \neq b_{k+1}$.

An anonymization function F is defined as a one-to-one function F: $\{0,1\}^n \rightarrow \{0,1\}^n$. An anonymization function F is prefix-preserving, if, given two IP addresses a and b that share a k-bit prefix, F(a) and F(b) also share a k-bit prefix. A prefix preservation anonymization function F takes necessarily the following canonical form:

$$F(a):=a'_1a'_2 \ldots a'_n \text{ where } a'_i=a_i \oplus f_{i-1}(a_1a_2 \ldots a_{i-1})$$

Such that $a=a_1a_2 \ldots an$ is an IP address and $f_i: \{0,1\}^n \rightarrow \{0,1\}^n$ are a set of functions and $f_0$ is a constant function, with i=1 . . . n and $\oplus$ is the exclusive "or" operation.

An instantiation of functions $f_i$ with cryptographically strong stream cipher or block ciphers is made such that $$f_i(a_1a_2 \ldots a_n):\mathcal{L}(\mathcal{R}(\mathcal{P}(a_1a_2 \ldots a_n),k))$$

Where k is the cryptographic key used in the pseudorandom function $\mathcal{R}$, which is the pseudorandom function or a pseudorandom permutation (i.e., a block cipher). The function $\mathcal{P}$ is a padding function that expands $a_1a_2 \ldots a_i$ into a longer string that matches the block size of $\mathcal{R}$. Length of k should follow the guideline specified for the pseudorandom function that is adopted (i.e. between 128 and 256 bits in 32-bit steps). The function $\mathcal{L}$ returns the "least significant bit".

PP is the cryptographically based prefix preserving IP address anonymization function, such that, given $a=a_1a_2 \ldots a_n$ an IP address and k a cryptographic key.

$$PP(a,k)=a'=a'_1a'_2 \ldots a'_n$$

One of the properties of PP is that if it can be applied iteratively and the end result will always preserve the prefixes, which means PP(PP(a, $k_0$), $k_1$)=a" and PP(PP(b, $k_0$), $k_1$)=b" such that a and b share the same k-bit prefix then a" and b" would share the same k-bit prefix. An example, of applying PP on records/data of a previous log trace/data is illustrated in FIG. 5.

The iterative application of PP using key k is denoted as follows $PP^j(-, k)$. For example, $PP^2(-, k)=PP(PP(-, k), k)$. This can be generalized to any number/quantity of iteration. This iterative application of PP has the following property:

$$PP^m(-,k)=PP^{m_1}(PP^{m_2}(-,k)) \text{ where } m=m_1+m_2 \quad \text{Property 1:}$$

PP is applied on a subset of records $\{r_j\}_{j\in[j_1,j_2]}$ where $j_1, j_2 \in \mathbb{N}$.

Figure 6:
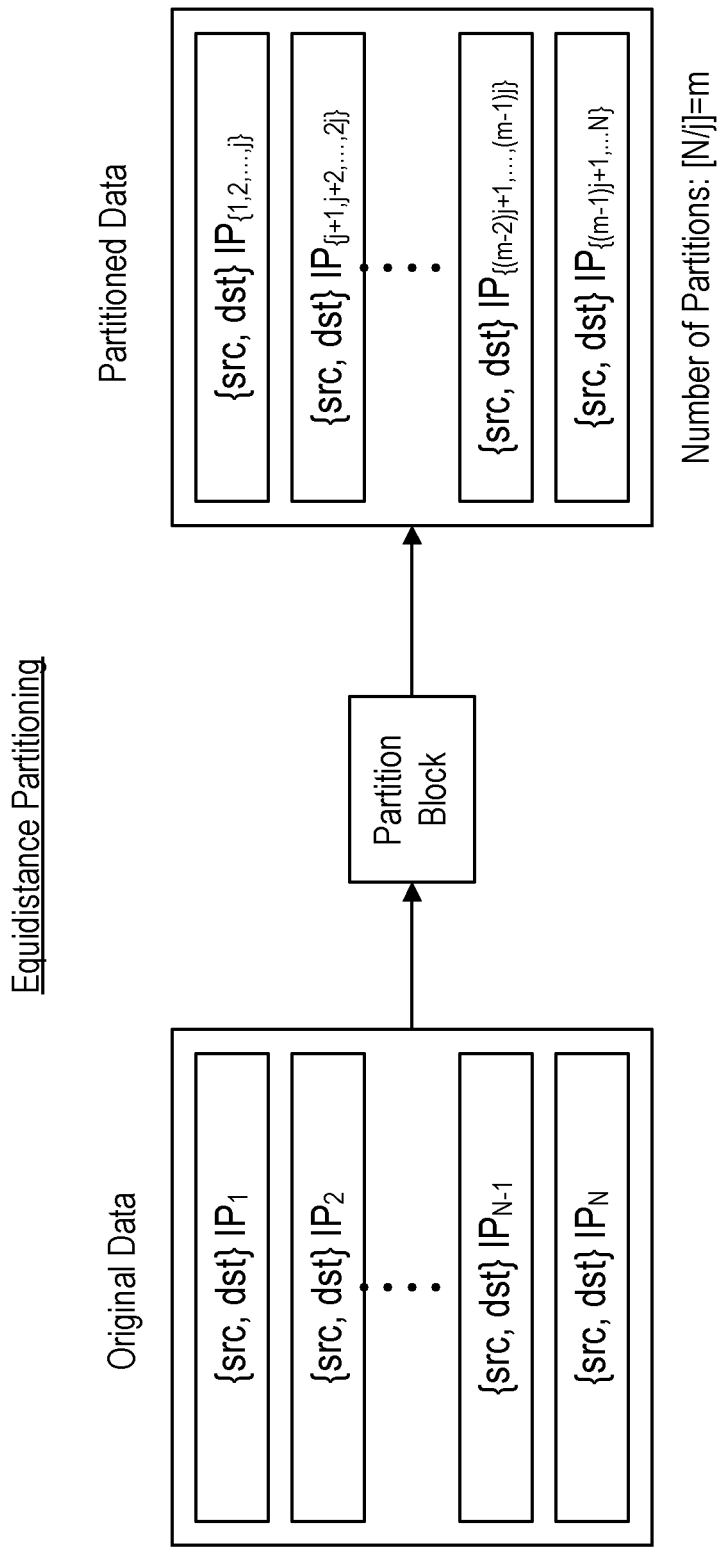
FIG. 6 is an example of equidistance partitioning in accordance with the principles of the disclosure.

It is assumed that a log can be partitioned into a set of non-overlapping partitions $\{P_i\}$. Let $P_i=\{r_j\}_{j\in[j_1,j_2]}$ called partition consisting of a set of records included in a log. Then $PP(P_i,k)$ is written. FIG. 6 is an example of equidistance partitioning. Thus, applying PP over a log implies applying it for each partition. As different keys can be applied for each partition, let R be the number/quantity of partitions, vector notation is used for the keys K=

$$\begin{bmatrix} k\_1 \\ \vdots \\ k\_R \end{bmatrix}$$

of dimension R.

Let $$L = \begin{bmatrix} P_1 \\ \vdots \\ P_R \end{bmatrix},$$

then it can be written as $$PP(L, K) = \begin{bmatrix} PP(P_1, K_1) \\ \vdots \\ PP(P_R, K_R) \end{bmatrix}$$

Figure 7:
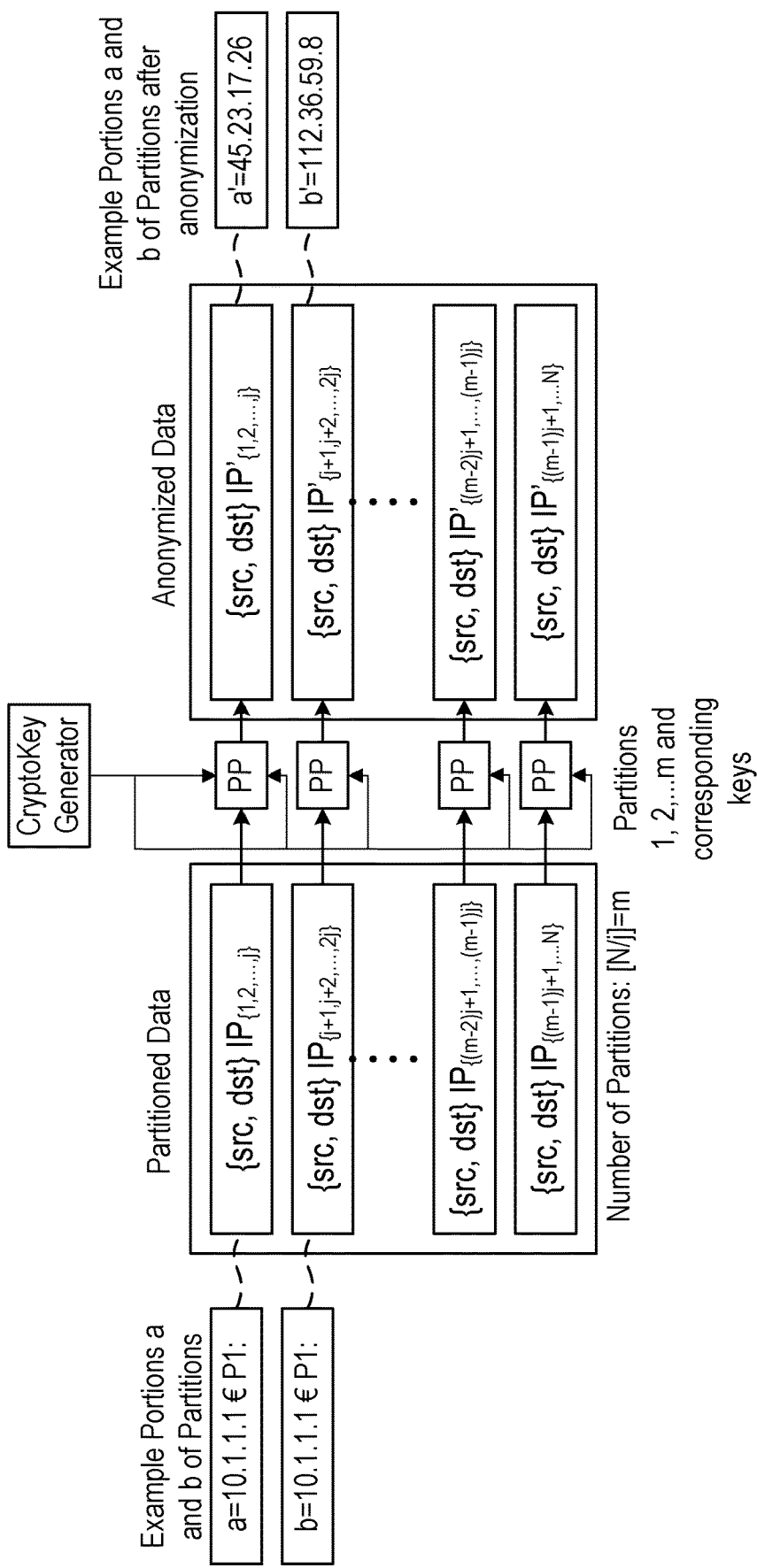
FIG. 7 illustrates an application of different of keys on different partitions in accordance with the principles of the disclosure.

FIG. 7 illustrates the application of different keys on different partitions.

The one-to-many IP mapping depicted in FIG. 7 could be also implemented using a single master key k. This approach encrypts all partitions under same key k but with different iterations for different partitions. For instance, for two partitions $P_1$ and $P_2$ and a master key k, we can run $PP(PP(P_1, k), k)$ and $PP(PP(PP(P_2, k), k), k)$ can be run, where k is applied two times on partition $P_1$ and three times on partition $P_2$. In the general case, key k is applied with different iterations for different partitions. Thus, a vector notation is used to denote the number/quantity of iterations of k used for each partition.

Let $$L = \begin{bmatrix} P_1 \\ \vdots \\ P_R \end{bmatrix}, \text{ and } V = \begin{bmatrix} v_1 \\ \vdots \\ v_R \end{bmatrix},$$

then this notation is used $$PP(L, V*k) = \begin{bmatrix} PP^{V_1}(P_1, k) \\ \vdots \\ PP^{V_R}(P_R, k) \end{bmatrix}$$

as a shorthand to denote that PP(−, k) is applied a certain number/quantity of times $v_i$ over the corresponding partition.

For instance, for R=2 with partitions $P_1$ and $P_2$, the vector $V=[{}_3^2]$ signifies that it is run 2 times k for the first partition and 3 times for the second partition. Then for any number/quantity of partitions, property two is as follows.

$$PP(PP(L,V_1*k),V_2*k)=PP(L,(V1+V2)*k) \quad \text{Property 2:}$$

The latter property will play a role in the privacy-utility network trace anonymization technique described herein.

Approach

Two roles are identified: data/log trace owner, i.e., node 12, and analyst, i.e., analyst node 14.

Figure 8A:
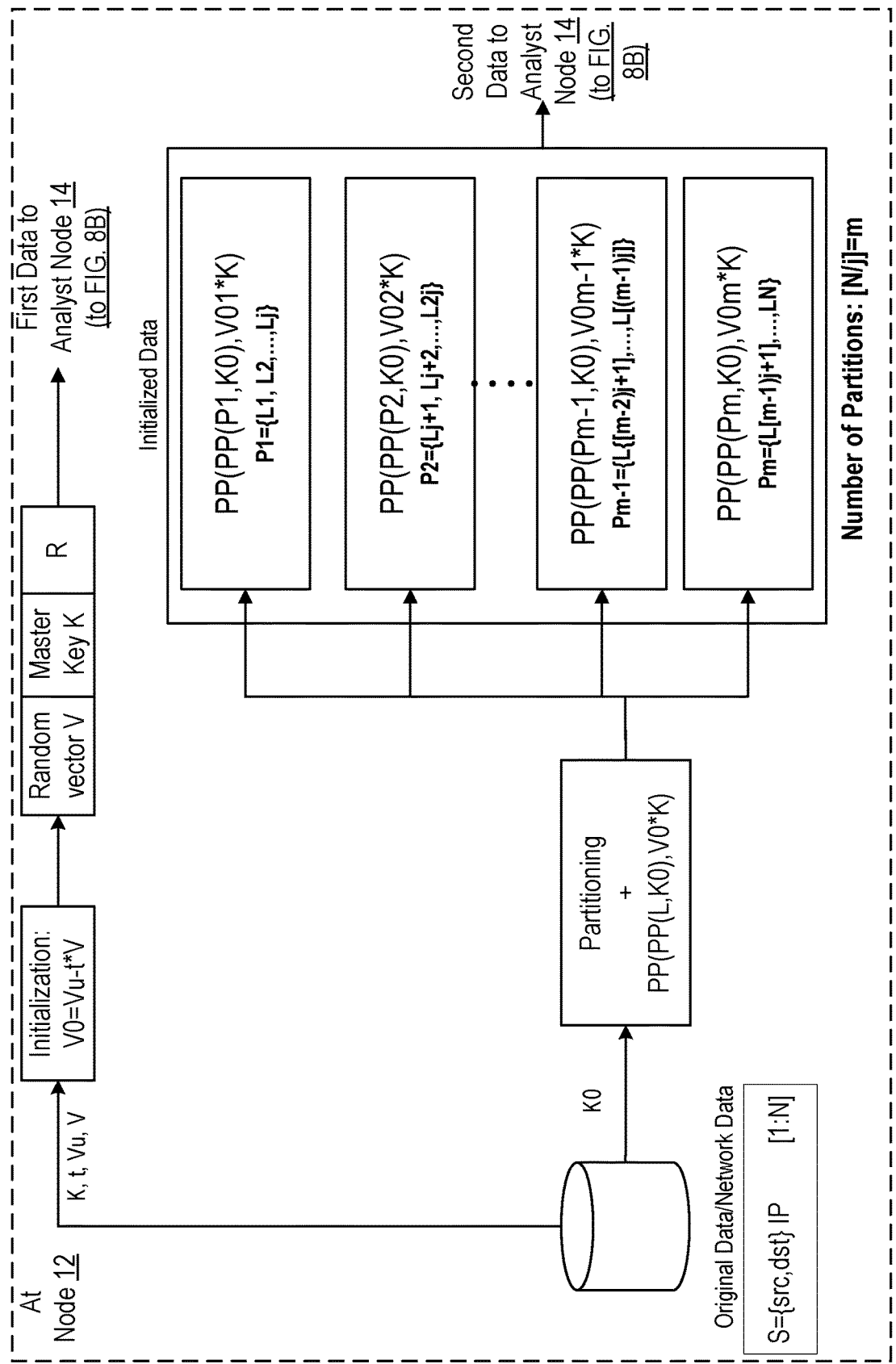
FIG. 8A-8B is a diagram of the anonymization and analysis process in accordance with the principles of the disclosure.
Figure 8B:
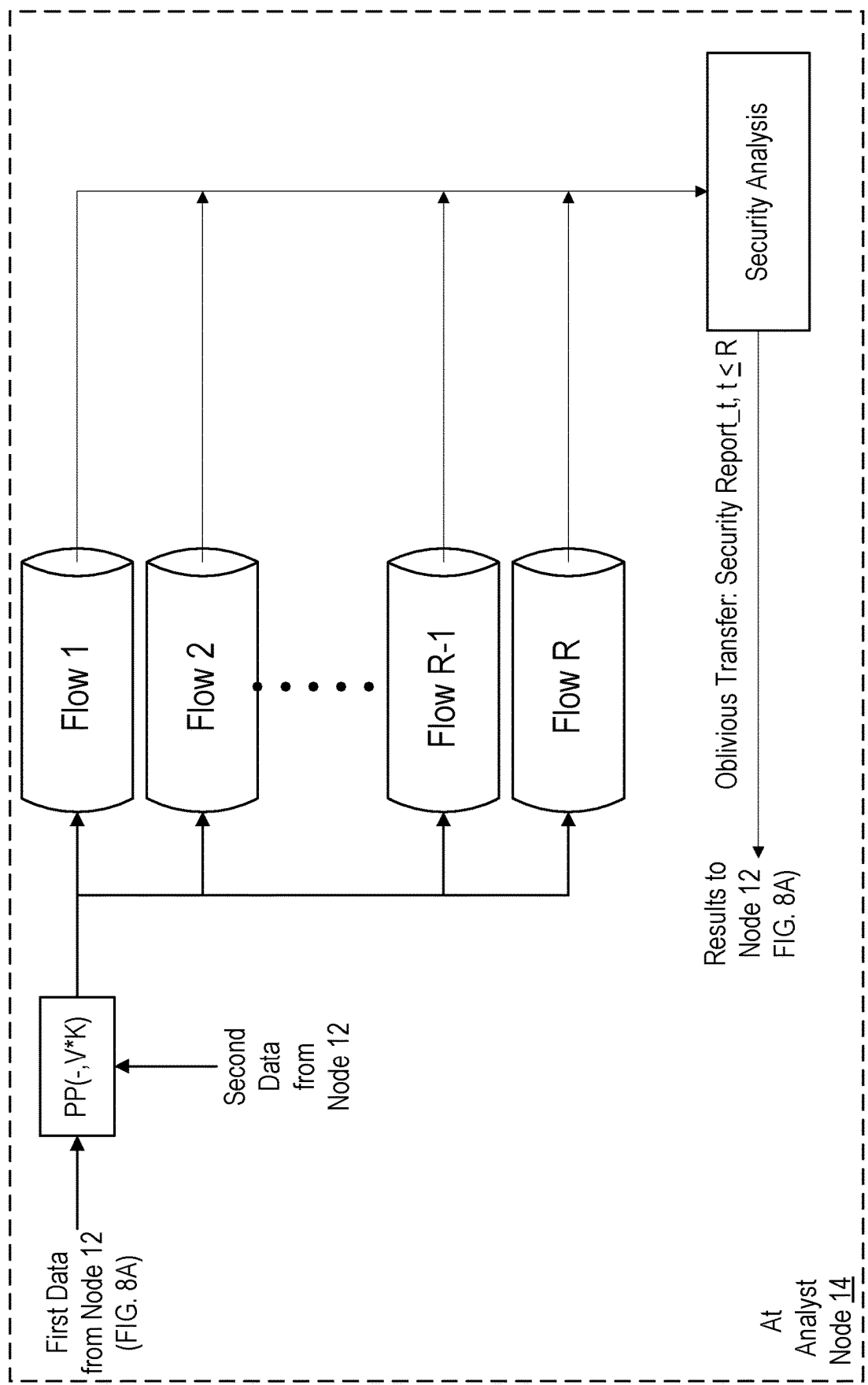

FIGS. 8A-8B illustrates actions that are performed by the data trace owner, i.e., node 12, or the analyst, i.e., analyst node 14, in order to anonymize the data (i.e., original data/network data), using the one or more embodiments described herein, while providing the benefits stated herein with respect to the teachings of the disclosure.

Step 1: Data owner: Keys Generation and Initial Anonymization

Data owner, i.e., node 12, generates two independent keys, namely $k_0$ (initial key as referred to as K0 in the figures) and k (Master key K).

Data owner, i.e., node 12, applies PP using the initial key $k_0$ such that $L_0=PP(L, k_0)$. The goal of $k_0$ is, in one or more embodiments, for addressing cryptographic attack. Mainly, attacks on PP are divided into two main categories: 1— Cryptographic attacks 2—Semantic attacks and both are addressed while outsourcing master key K.

Data owner, i.e., node 12, computes $Secpolicy_0$ using $k_0$ to anonymize the security policy (example of security policy IP1 must not communicate with IP2) using $PP(-, k_0)$ (example of security policy $PP(IP1, k_0)$) must not communicate with $PP(IP2, k_0)$). In one or more embodiments, a security policy defines one or more rules to be applied during the analysis.

Step 2: Data owner: Parameters Generation

Log partitioning: Data owner, i.e., node 12, selects a partitioning size R as discussed herein, and assigns different records ($r_i$) to different partitions ($P_j$), as discussed herein.

Choosing the numbers/quantities of iterations m and n: m represents the quantity of iterations that allows for one to obtain a fully prefix preserving log view, i.e., utility view, and n is the quantity of iteration the analyst needs to apply on a given log trace in total. In one or more embodiments, n and m are respective integers. In one or more embodiments, n and m are integers. Note, the m value corresponds to the fully prefix preserving log/data view, i.e., the view's analysis corresponds to the real/correct/true analysis of the data set. The data owner, i.e., node 12, selects the specific iteration m where the fully prefix preservation is reached (all IP in all records would be prefix-preserved), and the total number/quantity of iteration n (the n value can be any value as long as n>m. Though, the value of n defines a trade-off between the costs and security. As n increases, the security increases as the possible values for m increases. At the same time, a larger n (indicates more iterations and therefore more computation costs) defines the quantity of iteration that the analyst node 14 applies PP to the initially anonymized data, i.e., initialized data.

Data owner, i.e., node 12, chooses $V_u$ the coordination at step m. $V_u$ is the ultimate key combination vector to get a fully prefix preserving log among all partitions where all element are identical integers. Let $q \in [-B, B]$ be a uniform random number that is kept secret by the log owner, i.e., node 12, such that B is a fixed and large enough number (e.g., B can be of the order of 100s or 1000s) to increase the privacy property of this process. Let $$V_u = \begin{bmatrix} q \\ \vdots \\ q \end{bmatrix}$$

of dimension R, where R is the quantity of partitions.

Data owner, i.e., node 12, generates a random vector V of dimension R.

Data owner, i.e., node 12, computes the initial coordination $V_0$: Data owner calculates a first combination of applying the key on different partitions of the log. This is called the initial vector denoted by $V_0$.

$V_0$ is calculated based on V and $V_u$ and both $V_0$ and $V_u$ may be kept secret by the log owner.

Since the current coordination is the summation of previous coordination with the initial coordination $V_0$ (i.e. $V_0 = V_u - m*V$), this results in the guarantee that if data log owner initially applies $L_1 = PP(L, V_0*k)$, after m iterations, $L_m = PP^m(L_1, V*k)$, the analyst, even ignoring when it will precisely happen, will reach some point $L_m$, where $L_m = L_u = PP(L_1, V_u*k)$. However, as the analyst, i.e., analyst node 14, ignores m, the analyst will not be able to precisely identify which iteration leads to a fully prefix preserved version of log. Analyst node 14 will actually continue to apply vector V n minus m times. In one or more embodiments, if m times the random vector V is added to the coordination vector $V_0$, a resulting vector $V_u$ of this addition operation provides prefix preservation of initialed data with respect to the network data during the analysis.

As a corollary, the equation can also be written as $V_0 = V_u - \Sigma_{i=1}^{m} V_i$ where m vectors $V_i$ are generated randomly, representing each a different combination of k for each partition and for each iteration i. In this case, instead of applying the same matrix V at each iteration, different Vi matrices are applied. In practice this indicates that the PP operations, e.g., application of prefix preserving cryptographic function(s), on different partitions may differ from one iteration to another. Note that as for one approach, at step m, it may have the $V_u$ applied to the data set. To illustrate this, for example, in first iterations k is applied 3 times on P1, P4 and 2 times on P2, and P3. Though, the final number of applications may always q at step m.

Figure 9:
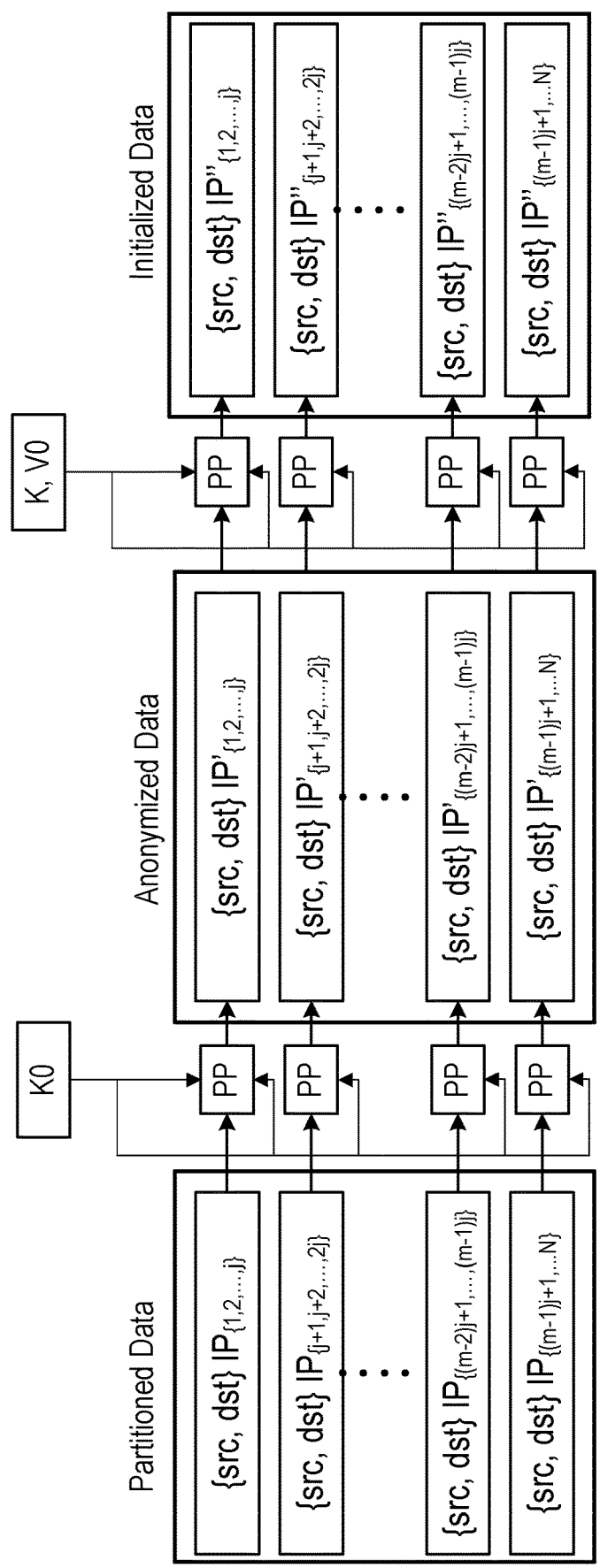
FIG. 9 is a block diagram of one embodiment the partition-based prefix preserving anonymization in accordance with the principles of the disclosure.

Step 3: Data owner: Partition-based PP Anonymization. FIG. 9 is a block diagram of one embodiment of Step 3.

Initial Anonymization using $V_0$. Data owner, i.e., node 12, uses $V_0$ to anonymize $L_0$ such that $L_1 = PP(L, V_0*k)$.

Data owner, i.e., node 12, defines a security policy using different IP address value, called $SecPolicy_0$. The data owner then uses $V_i$ elements of vector $V_0$ to anonymize the security policy based on k, such that $SecPolicy_1 = PP(SecPolicy_0, V_0*k)$, where each IP address in a given partition $P_i$ will be consistently anonymized using the combination of key used for that IP address in that partition in $L_1$.

Data owner, i.e., node 12, exports, i.e., communicates, $L_1$, V, $SecPolicy_1$, and k to the analyst, i.e., analyst node 14, and then requests from the analyst to apply N iterations of the vector V with the master key k on log $L_1$ using PP.

Figure 10:
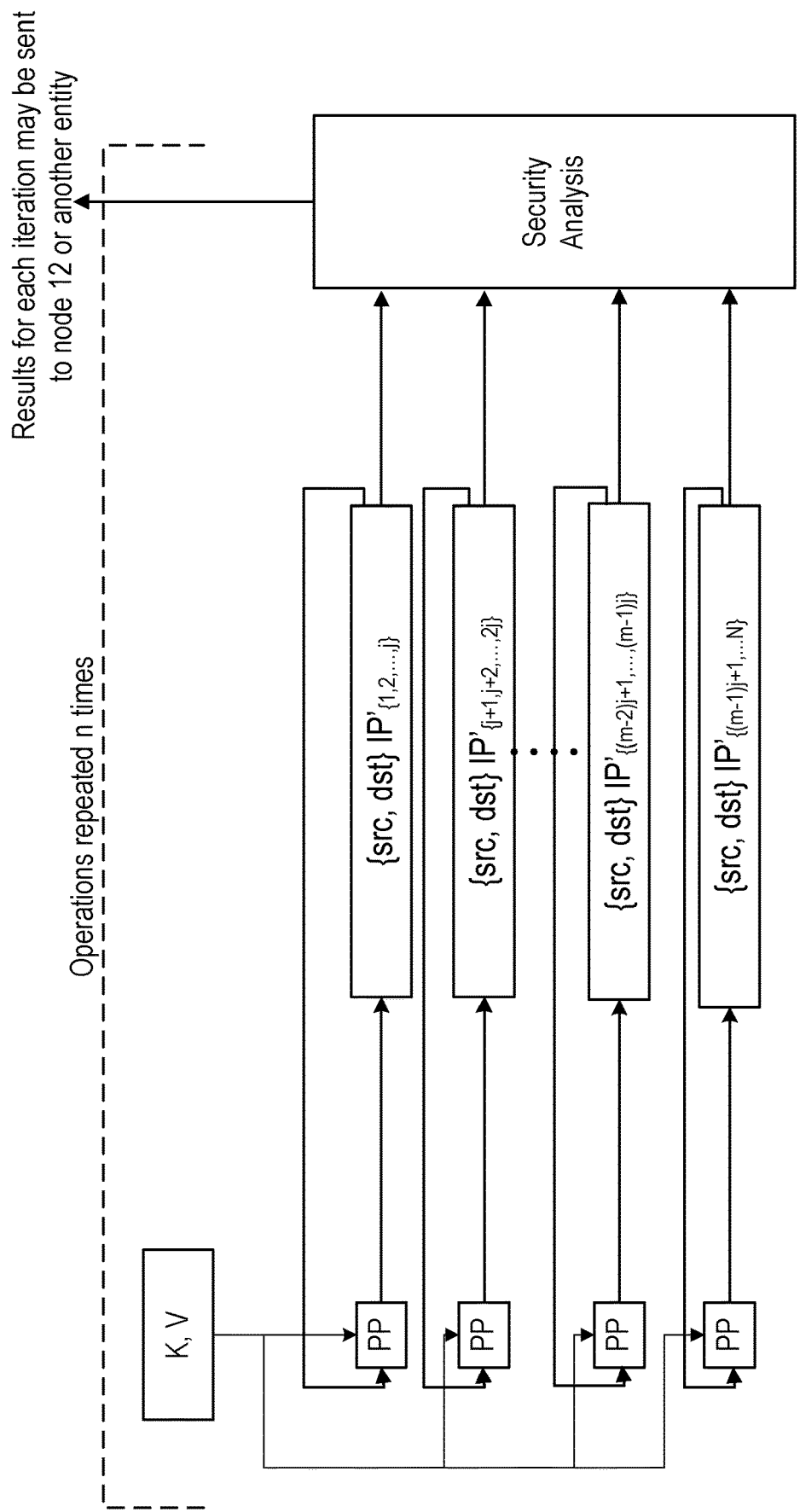
FIG. 10 is a block diagram of one embodiment of a one to many data generation and data analysis in accordance with the principles of the disclosure.

Step 4: Analyst: one to many Log generation and Log analysis. FIG. 10 is a block diagram of one embodiment of Step 4.

Analyst, i.e., analyst node 14, generates N logs from $L_1$ using the key k based on the vector V.

The analyst partitions $L_1$ into R partitions, the log partitioning schema used by the data owner, i.e., node 12, is known to the analyst. The analyst knows about the number/quantity of partitions because the vector size is known.

The analyst applies PP, with V and k and obtain a new version of the log $L_i$ which is the result of applying on each partition $P_i v_i$ times k The analyst repeats the last step N times for the previous output to obtain a set of N different anonymized version of the log L, denoted by $\{L_i\}_{\{i \backslash in \{2, \ldots, N+1\}\}}$.

Analyst performs same iteration on $SecPolicy_1$ and obtains N security policies $\{SecPolicy_i\}\_\{i \in \{2, \ldots, N+1\}\}$ The analyst then proceeds to the analysis of anonymized logs $\{L_i\}_{\{i \backslash in \{2, \ldots, N+1\}\}}$ with respect to $SecPolicy_i$ Analyst, i.e., analyst node 14, communicates all analysis results by transferring all audit_result_i back to the data owner.

Presented in pseudo-code:
For i=1 to (n) perform do
Apply V on the Li
Apply V on SecPolicy_i
Audit(L_i, SecPolicy_i) and store result as audit_result_i Step 5: Data owner: Validation of audit results The log owner, i.e., node 12, only considers the audit result done at iteration m.

If there is a security breach, the data owner, i.e., node 12, can reverse logs using PP with K and $k_0$. Reversibility of PP is provided in the appendix document.

As a corollary, the audit_result_m can be returned to the data owner, i.e., node 12, using private information retrieval (PIR), which also limits the overhead.

Log Partitioning

In this section, the scheme used to divide the original log into different partitions is described, i.e., describes the partitioning of network data. Partitioning is chosen by the data owner and can be based on any characteristic including IP value, Time stamps, etc. Different partitioning algorithm results in different privacy guarantee.

Figure 11:
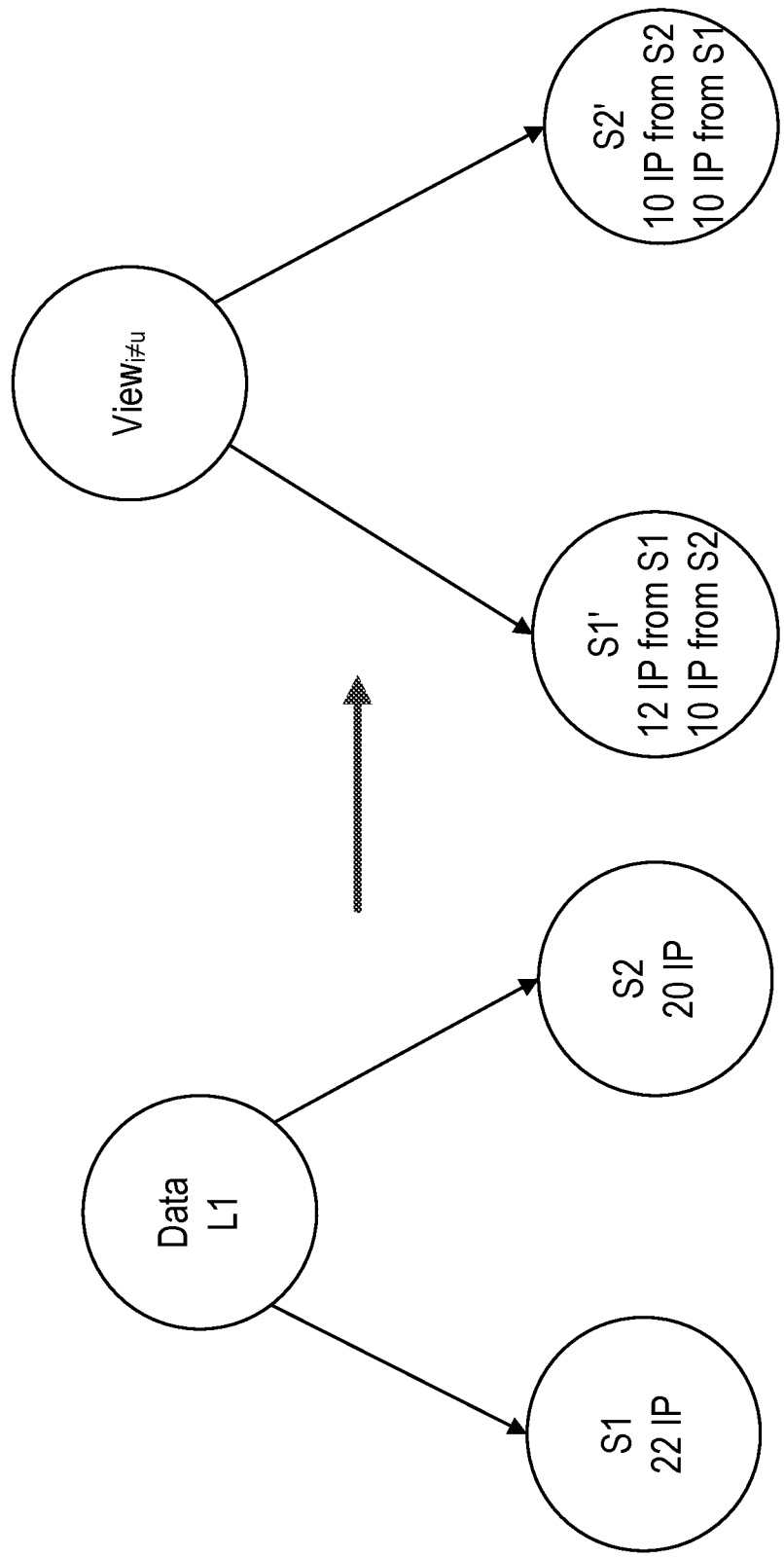
FIG. 11 is a diagram of subnets where internet protocols from one subnet are exchanged with internet protocols of another subnet when different views are generated in accordance with the principles of the disclosure.

Partitioning+Pre-Outsource Processing is discussed below. As depicted in FIG. 11, IP addresses from one subnet replace IP addresses from other subnets when different views are generated. Note that the partitioning algorithm described herein together with the two-role scheme described above help guarantee that at iteration u, IP addresses are returning to their original subnets. Algorithm 1, illustrated below, demonstrates the procedure.

---
Algorithm 1: Partitioning and Pre-Processing
---

Input: $\mathcal{L}$: original set of network IPs
R: Number of partitions
Output: IP-Partitions: $\mathcal{P}_1, ..., \mathcal{P}_R$ based on IP values
Partitioning:
1          Divide IPs into R partition based on IP values
Pre-outsource Processing:
2          Assign all IPs to maximally disjoint subnets $S_1, S_2, ..., S_i$
3          Find its biggest subnet $S_j$ and its heavy hitter IP $H_j$
4          Substitute Heavy Hitter IPs: $H_1, H_2, ..., H_i$ in subnets $S_1, S_2, ..., S_i$ with P $P^{a_i}$ ($H_j$, k)
5          Substitute rest of IPs in: subnets $S_1, S_2, ..., S_i$ with P $P^{a_i}$ ($H_j \oplus I P \oplus H_i$, k)
return $\mathcal{P}_1, ..., \mathcal{P}_R$

---

Line 3 identifies the so-called "heavy hitter" IP addresses (IPs) in one of the subnets in the log. Heavy hitter IPs corresponds to the most frequent IP address of a subnet. Line 4 and Line 5 help ensure that the relationship among IP addresses, e.g., subnet co-residency, would be kept at iteration u while provide the potential of migration in the meantime.

Experimental Results

Figure 12:
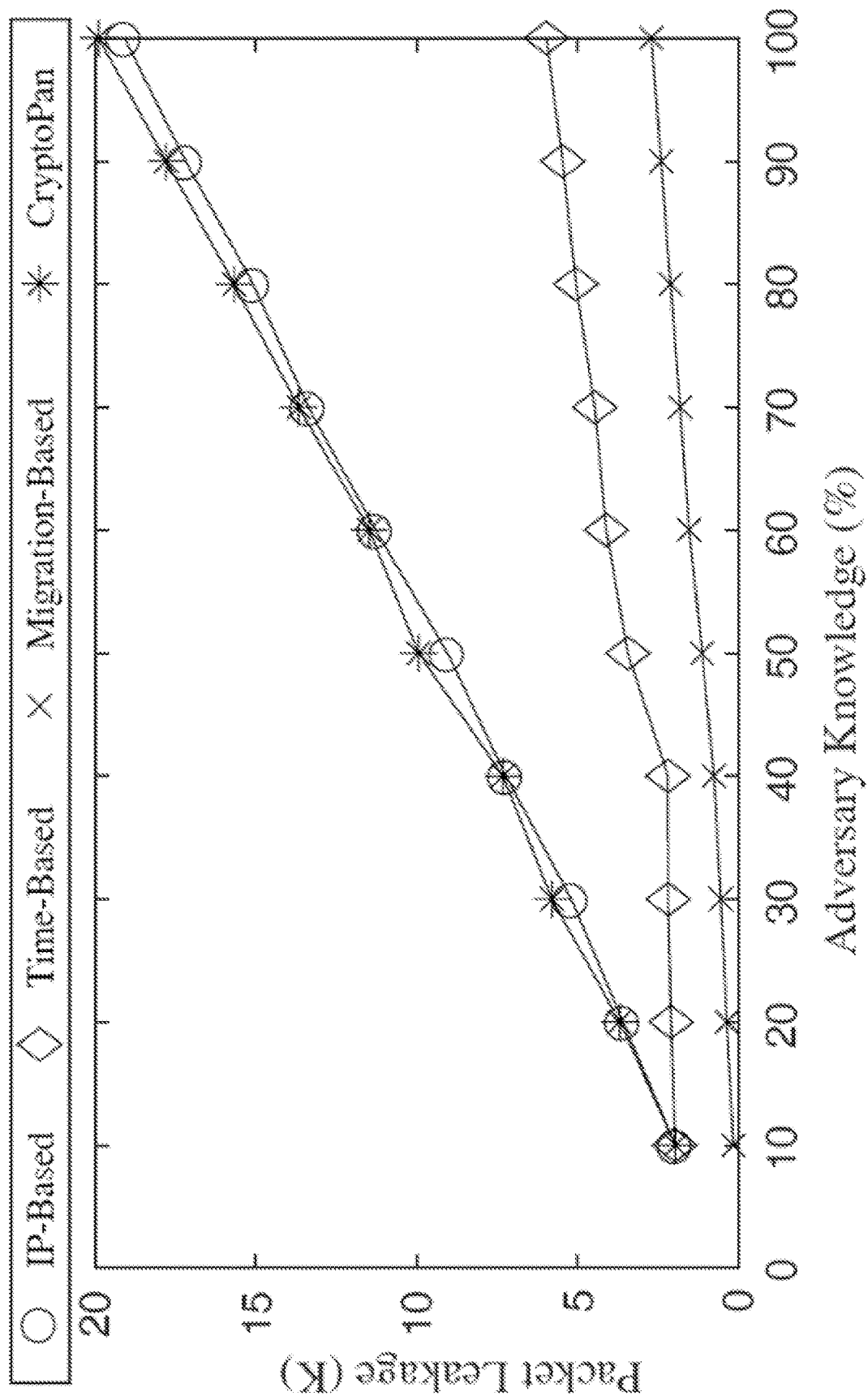
FIG. 12 is a diagram illustrating the results of semantic attacks on one or more embodiments of the disclosure and on several known algorithms for various quantities of adversary knowledge.

FIG. 12 is a diagram illustrating the results of semantic attacks on one or more embodiments of the disclosure and on several known algorithms for various quantities of adversary knowledge. In general, FIG. 12 illustrates K quantity of packet leakage that may results from semantic attacks on a respective cryptography-based algorithm for various quantities of adversary knowledge. Percentage of adversary knowledge may correspond to a situation where the adversary has prior knowledge on some percentage of IP addresses, for example 100% may indicate that the adversary knows all the IP addresses that are encrypted using the respective algorithm. Based on this prior knowledge (i.e., adversary knowledge), the adversary attempts to inject packets into the system in order to try to determine the keys used by the cryptography-based algorithm, thereby possibly leading to a quantity of packet leakage. Packet leakage may correspond to a percentage of packets that may be de-anonymized by the adversary. Packet leakage may correspond to a quantity of packets that may be de-anonymized.

The plots for each cryptography-based algorithm in FIG. 12 are based on the following parameters/quantities: 8 partitions, 4 views and 20,000 (20 k) packets, where adversary knowledge may be varied as shown in the x axis of FIG. 12. The results illustrated in FIG. 12 represent the success percentage, i.e., percentage of packet leakage, for such a$_n$ attack. The results of one or more embodiments of the disclosure are designated as "Migration-Based" in FIG. 12. As illustrated in FIG. 12, the Migration-Based" plot has a lower quantity of package leakage, i.e., lower percentage, than various cryptography-based algorithms (i.e., IP-Based, Time-Based, CryptoPan) for various quantities of adversary knowledge.

Figure 13:
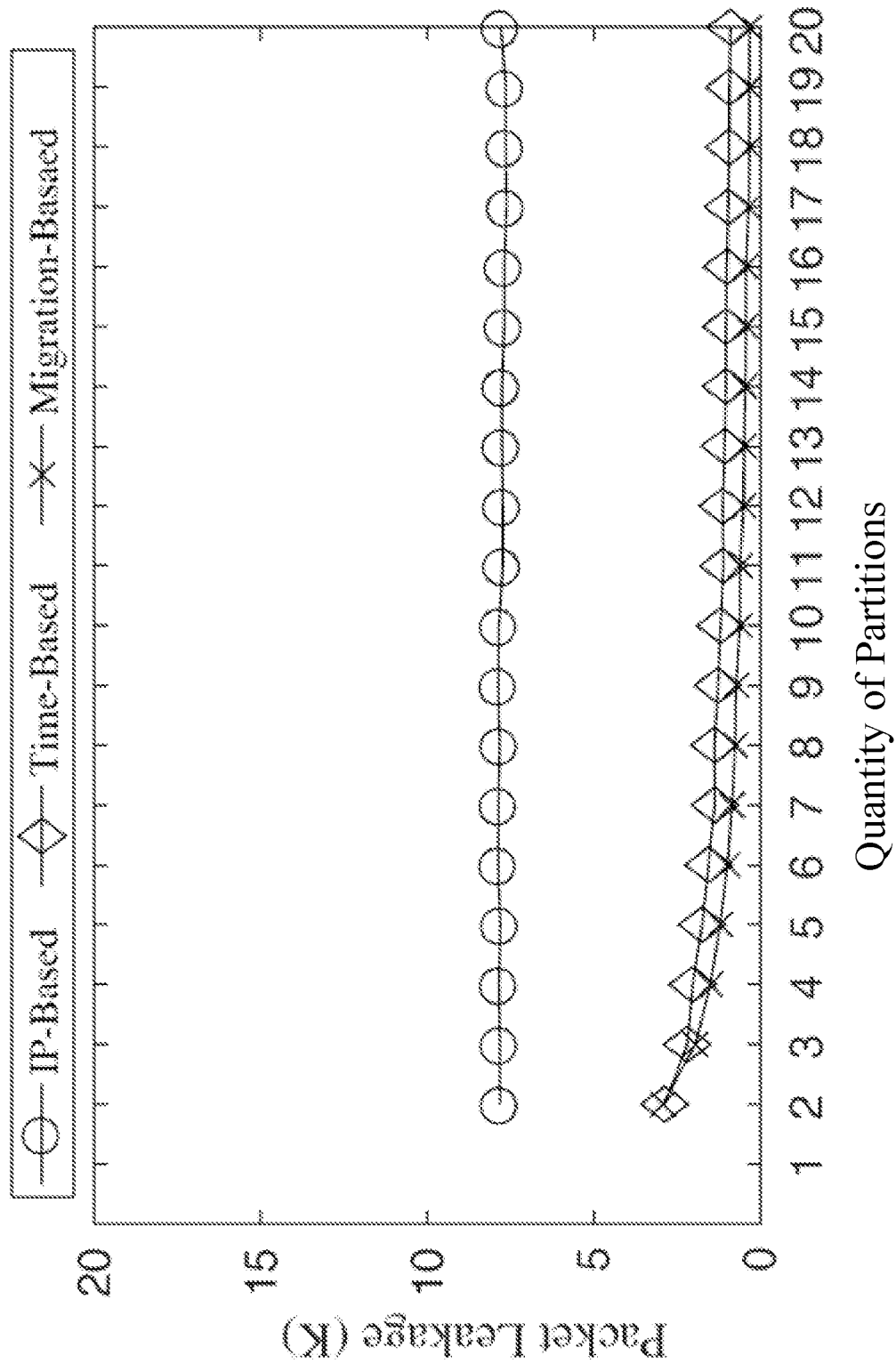
FIG. 13 is a diagram illustrating the results of semantic attacks on one or more embodiments of the disclosure and on several known algorithms for various quantities of partitions.

FIG. 13 is a diagram illustrating the results of semantic attacks on one or more embodiments of the disclosure and on several known algorithms for various quantities of partitions. In general, FIG. 13 illustrates K percentage quantity of packet leakage that may result from semantic attacks on a respective cryptography-based algorithm for various quantities of partitions. Percentage of adversary knowledge and type of attack are described above with respect to FIG. 12. The plots for each cryptography-based algorithm in FIG. 13 are based on the following parameters/quantities: adversary knowledge of 40%, 4 views and 20,000 (20 k) packets, where quantity of partitions be varied as shown in the x axis of FIG. 13.

The results illustrated in FIG. 13 represent the success percentage for such an attack. The results of the success percentage of one or more embodiments of the disclosure are designated as "Migration-Based" in FIG. 13. As illustrated in FIG. 13, the "Migration-Based" plot typically results in a lower quantity of package leakage than various cryptography-based algorithms (i.e., IP-Based, Time-Based, CryptoPan) using a respective quantity of partitions.

Figure 14:
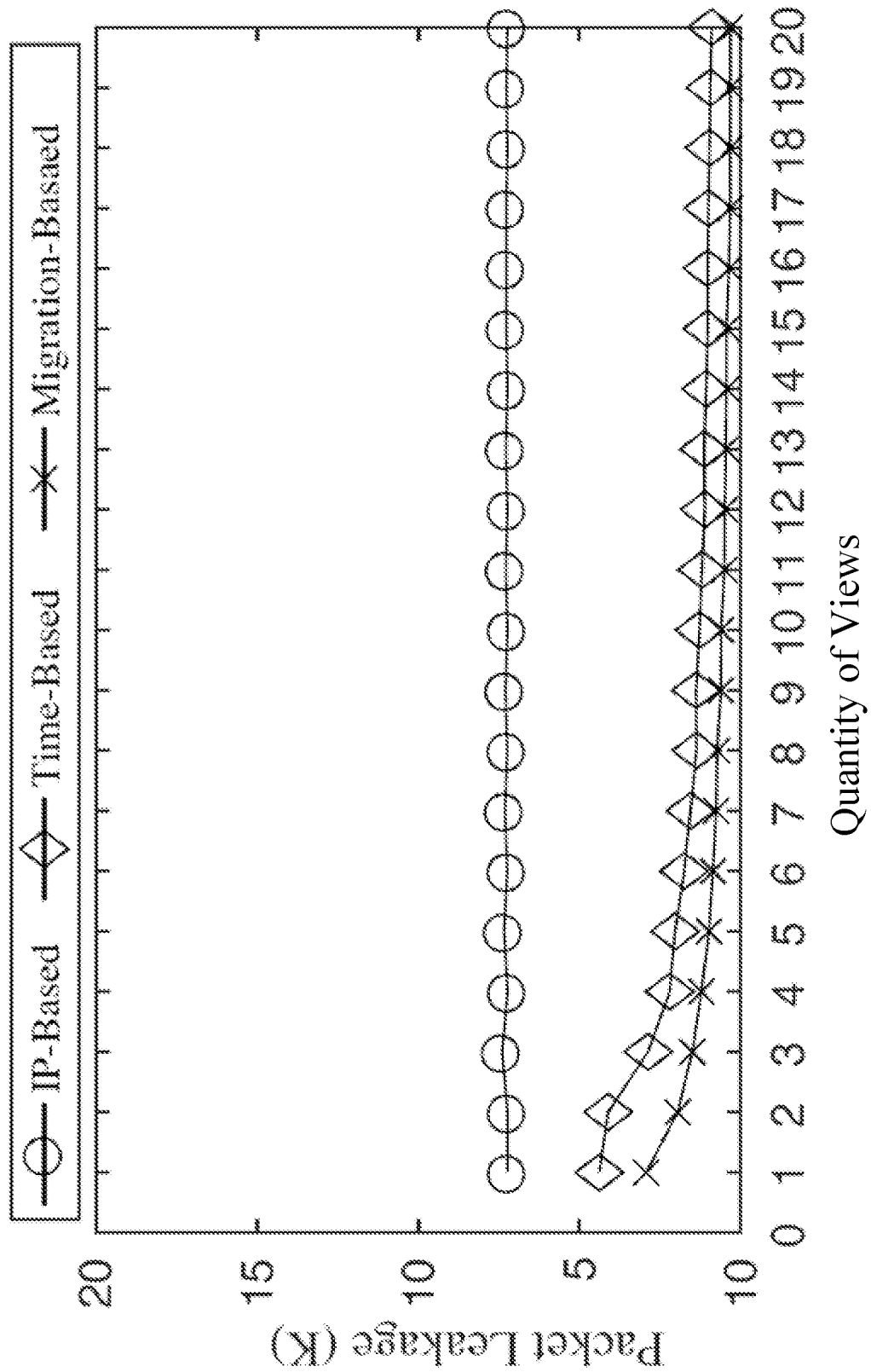
FIG. 14 is a diagram illustrating the results of semantic attacks on one or more embodiments of the disclosure and on several known algorithms for various quantities of views.

FIG. 14 is a diagram illustrating the results of semantic attacks on one or more embodiments of the disclosure and on several known algorithms for various quantities of views. In general, FIG. 14 illustrates K percentage quantity of packet leakage that may result from semantic attacks on a respective cryptography-based algorithm for various quantities of views. Percentage of adversary knowledge and type of attack are described above with respect to FIG. 12. The plots for each cryptography-based algorithm in FIG. 14 are based on the following parameters/quantities: 8 partitions, adversary knowledge of 40% and 20 k packets, where the number/quantity of views may be varied as shown in the x axis of FIG. 14.

The results illustrated in FIG. 14 represent the success percentage for such an attack. The results of the success percentage of one or more embodiments of the disclosure are designated as "Migration-Based" in FIG. 14. As illustrated in FIG. 14, the Migration-Based" plot has a lower quantity of package leakage than various cryptography-based algorithms (i.e., IP-Based, Time-Based) given a respective quantity of views implemented by these respective algorithms.

Figure 15:
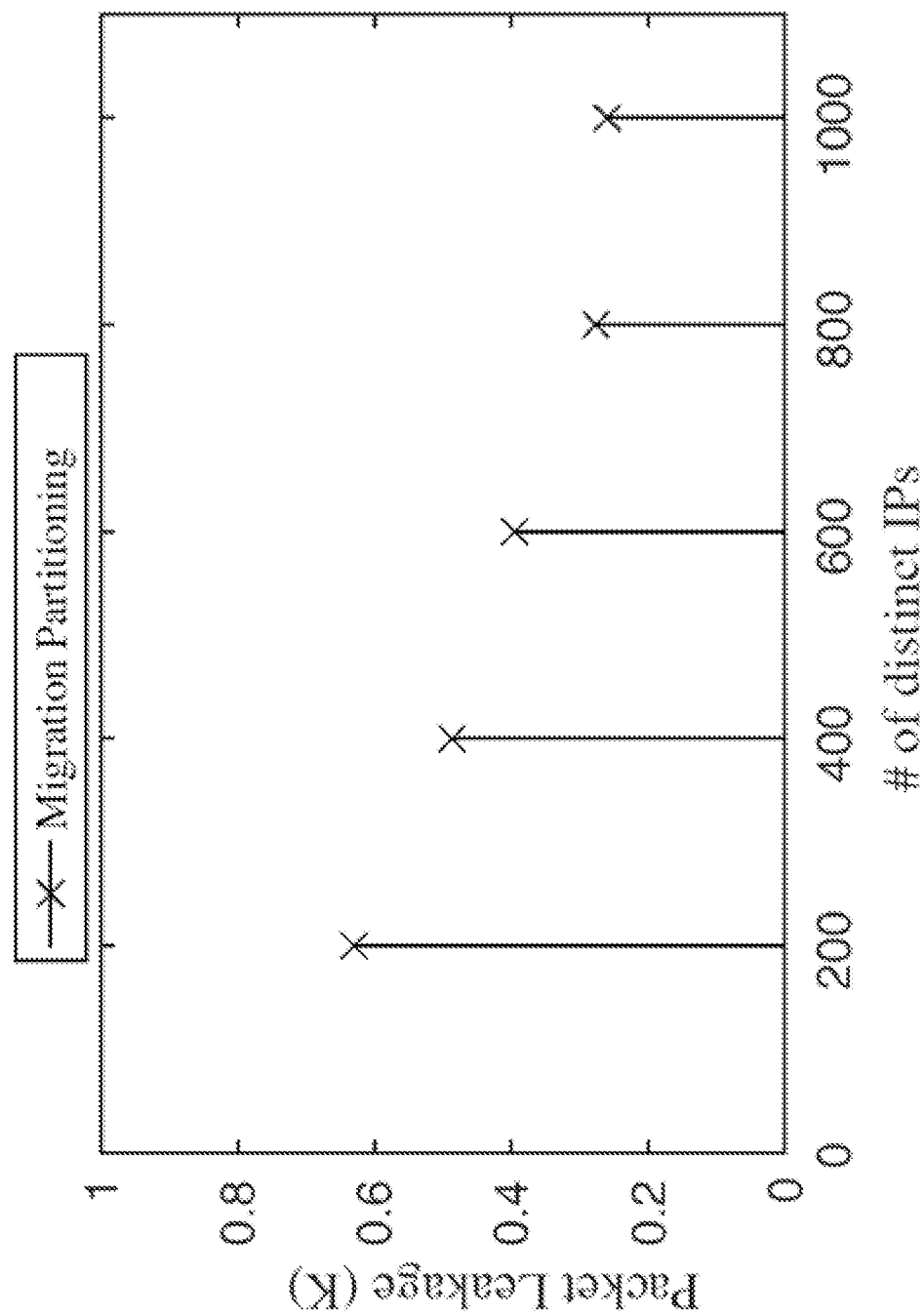
FIG. 15 is a diagram illustrating the results of semantic attacks on one or more embodiments of the disclosure for various quantities of distinct internet protocol addresses.

FIG. 15 is a diagram illustrating the results of semantic attacks on one or more embodiments of the disclosure for various quantities of distinct IP addresses (IPs). In general, FIG. 15 illustrates K percentage quantity of packet leakage that may result from semantic attacks on the one or more embodiments of the disclosure for various quantities of distinct IPs. Percentage of adversary knowledge and type of attack are described above with respect to FIG. 12. The plot for the one or more embodiments of the disclosure in FIG. 15 is based on the following parameters/quantities: 8 partitions, 8 views and 10 k packets and adversary knowledge of 40%, where the number/quantity of distinct IPs may be varied as shown in the x axis of FIG. 15. The results illustrated in FIG. 15 represent the success percentage for such an attack. The results of the success percentage of one or more embodiments of the disclosure are designated as "Migration Partitioning" in FIG. 15.

Figure 16:
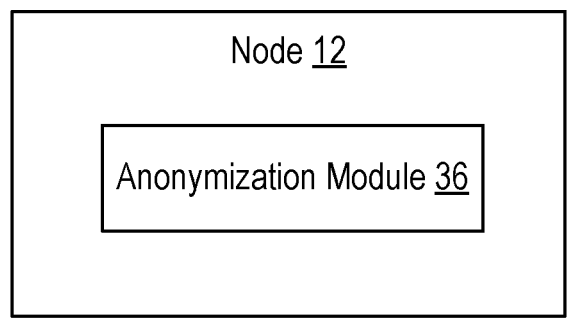
FIG. 16 is a block diagram of another embodiment of node in accordance with the principles of the disclosure.

FIG. 16 is a block diagram of another embodiment of Node 12 in accordance with the principles of the disclosure. Node 12 includes anonymization module 36 that is configured to perform the anonymization process described herein with respect to anonymization code 24 and the data owner.

Figure 17:
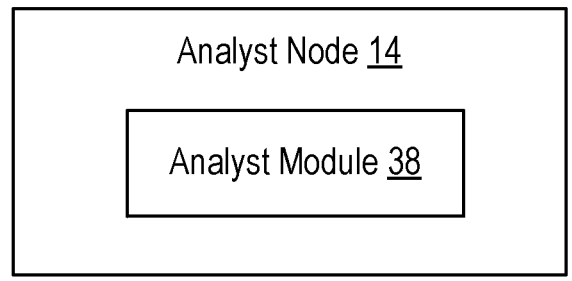
FIG. 17 is a block diagram of another embodiment of analyst node in accordance with the principles of the disclosure.

FIG. 17 is a block diagram of another embodiment of analyst node 14 in accordance with the principles of the disclosure. Analyst node 14 includes analyst module 38 that is configured to perform processes described herein with respect to analyst code 34 and analyst.

Therefore, the disclosure advantageously provides an anonymization technique for IP addresses that preserves IP addresses prefixes while improving privacy and utility and decreasing overhead. The disclosure advantageously partitions the log records into different partitions to be anonymized differently. The disclosure advantageously applies different cryptographic keys on different such that for the same IP address in different partitions corresponds different anonymized IP addresses. As a corollary, different combinations of the same key can be used for different partitions. The disclosure advantageously anonymizes IP addresses in both the log and the security policies for an increased privacy. The solution anonymizes the IP addresses in the security policy using different cryptographic keys consistently with the anonymization of these IP addresses in the anonymized log file. As a corollary, different combinations of the same key can be used for anonymization of the IP addresses in the security policy consistently with the anonymization of these IP addresses in the anonymized log file. The solution proposes a one-to-many mapping of the same log trace to be built and then analyzed by the analyst to increase the privacy benefit of the anonymization solution and to decrease the chances that the analyst learn information from the received log trace or the security policy.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings

What is claimed is:

1. A node for anonymizing network data for analysis by another node, the node comprising:
processing circuitry configured to:
generate anonymized data based at least in part on a first cryptographic key and network data;
calculate a coordination vector based at least in part on a random vector;
generate initialized data based at least in part on the anonymized data, a second cryptographic key and the coordination vector, the second cryptographic key being independent from the first cryptographic key;
transmit the initialized data, the random vector, a security policy, the second cryptographic key and instructions to analyze n iterations of the initialized data and the security policy using the random vector and the second cryptographic key;
receive results of the analysis of the n iterations of the initialized data and the security policy using the random vector and the second cryptographic key; and the analysis of an m iteration of the n iterations corresponding to an analysis of the initialized data with prefix preservation, the analysis of the remaining iterations of the n iterations failing to be prefixed preserved, where n and m are integers and n is greater than m.

2. The node of claim 1, wherein the processing circuitry is further configured to partition the network data into a plurality of non-overlapping partitions, the generating of the initialized data includes applying at least one cryptographically based anonymization function to each one of the plurality of non-overlapping partitions.

3. The node of claim 1, wherein the coordination vector is calculated based at least in part on the random vector and a key combination vector, the key combination vector allowing for the m iteration to be prefix preserved.

4. The node of claim 1, wherein if m times the random vector is added to the coordination vector, a resulting vector of this addition operation providing prefix preservation of the initialized data with respect to the network data during the analysis.

5. The node of claim 1, wherein the network data includes a plurality of destination internet protocol addresses and a plurality of source internet protocol addresses.

6. The node of claim 1, wherein the security policy includes at least one rule to be applied during the analysis.

7. The node of claim 1, wherein the anonymized data is generated by applying at least one cryptographic operation to the network data using the first cryptographic key; and
the initialized data is generated by applying the at least one cryptographic operation to the anonymized data using the second cryptographic key and the coordination vector.

8. The node of claim 1, wherein the instructions to analyze n iterations of the initialized data and the security policy using the random vector and the second cryptographic key includes instructions to apply at least one cryptographic operation to the initialized data using the second cryptographic key and the random vector.

9. The node of claim 1, wherein the processing circuitry (18) is further configured to transmit the second cryptographic key.

10. A method for a node for anonymizing network data for analysis by another node, the method comprising:
generating anonymized data based at least in part on a first cryptographic key and network data;
calculating a coordination vector based at least in part on a random vector;
generating initialized data based at least in part on the anonymized data, a second cryptographic key and the coordination vector, the second cryptographic key being independent from the first cryptographic key;
transmitting the initialized data, the random vector, a security policy, the second cryptographic key and instructions to analyze n iterations of the initialized data and the security policy using the random vector and the second cryptographic key;
receiving results of the analysis of the n iterations of the initialized data and the security policy using the random vector and the second cryptographic key; and
the analysis of an m iteration of the n iterations corresponding to an analysis of the initialized data with prefix preservation, the analysis of the remaining iterations of the n iterations failing to be prefixed preserved, where n and m are integers and n is greater than m.

11. The method of claim 10, further comprising partitioning the network data into a plurality of non-overlapping partitions, the generating of the initialized data includes applying at least one cryptographically based anonymization function to each one of the plurality of non-overlapping partitions.

12. The method of claim 10, wherein the coordination vector is calculated based at least in part on the random vector and a key combination vector, the key combination vector allowing for the m iteration to be prefix preserved.

13. The method of claim 10, wherein if m times the random vector is added to the coordination vector, a resulting vector of this addition operation providing prefix preservation of the initialized data with respect to the network data during the analysis.

14. The method of claim 10, wherein the network data includes a plurality of destination internet protocol addresses and a plurality of source internet protocol addresses.

15. The method of claim 10, wherein the security policy includes at least one rule to be applied during the analysis.

16. The method of claim 10, wherein the anonymized data is generated by applying at least one cryptographic operation to the network data using the first cryptographic key; and
the initialized data is generated by applying the at least one cryptographic operation to the anonymized data using the second cryptographic key and the coordination vector.

17. The method of claim 10, wherein the instructions to analyze n iterations of the initialized data and the security policy using the random vector and the second cryptographic key includes instructions to apply at least one cryptographic operation to the initialized data using the second cryptographic key and the random vector.

18. The method of claim 10, further comprising transmitting the second cryptographic key.

19. A node for anonymizing network data for analysis by another node, the node comprising:
an anonymization module configured to:
generate anonymized data based at least in part on a first cryptographic key and network data;
calculate a coordination vector based at least in part on a random vector;
generate initialized data based at least in part on the anonymized data, a second cryptographic key and the coordination vector, the second cryptographic key being independent from the first cryptographic key;
transmit the initialized data, the random vector, a security policy and instructions to analyze n iterations of the initialized data and the security policy using the random vector and the second cryptographic key;
receive results of the analysis of the n iterations of the initialized data and the security policy using the random vector and the second cryptographic key; and
the analysis of an m iteration of the n iterations corresponding to an analysis of the initialized data with prefix preservation, the analysis of the remaining iterations of the n iterations failing to be prefixed preserved, where n and m are integers and n is greater than m.

20. The node of claim 19, wherein the anonymization module is further configured to partition the network data into a plurality of non-overlapping partitions, the generating of the initialized data includes applying at least one cryptographically based anonymization function to each one of the plurality of non-overlapping partitions.

21. The node of claim 19, wherein the coordination vector is calculated based at least in part on the random vector and a key combination vector, the key combination vector allowing for the m iteration to be prefix preserved.

22. The node of claim 19, wherein if m times the random vector is added to the coordination vector, a resulting vector of this addition operation providing prefix preservation of initialed data with respect to the network data during the analysis.

* * * * *